US012508775B2

(12) United States Patent
Shinohara et al.

(10) Patent No.: US 12,508,775 B2
(45) Date of Patent: Dec. 30, 2025

(54) ADDITIVE MANUFACTURING METHOD, ADDITIVE MANUFACTURING APPARATUS, AND ADDITIVE MANUFACTURING SYSTEM

(71) Applicant: Mitsubishi Electric Corporation, Tokyo (JP)

(72) Inventors: Nobuhiro Shinohara, Tokyo (JP); Daiji Morita, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 236 days.

(21) Appl. No.: 18/024,516

(22) PCT Filed: Oct. 15, 2020

(86) PCT No.: PCT/JP2020/038869
§ 371 (c)(1),
(2) Date: Mar. 3, 2023

(87) PCT Pub. No.: WO2022/079849
PCT Pub. Date: Apr. 21, 2022

(65) Prior Publication Data
US 2023/0321914 A1    Oct. 12, 2023

(51) Int. Cl.
*B29C 64/393*    (2017.01)
*B29C 64/118*    (2017.01)
(Continued)

(52) U.S. Cl.
CPC .......... *B29C 64/393* (2017.08); *B29C 64/118* (2017.08); *B29C 64/227* (2017.08);
(Continued)

(58) Field of Classification Search
CPC ... B29C 64/393; B29C 64/118; B29C 64/227; B29C 64/295; B29C 64/35;
(Continued)

(56) References Cited

U.S. PATENT DOCUMENTS 5,859,402 A * 1/1999 Maier .................. B23K 26/348
219/137 R
5,866,870 A * 2/1999 Walduck ................ B23K 28/02
219/121.45
(Continued)

FOREIGN PATENT DOCUMENTS

DE    10 2015 117 238 A1    4/2017
DE    10 2018 128 757 A1    5/2020
(Continued)

OTHER PUBLICATIONS

German Office Action with an English machine translation (German Application No. 112020007684.9, Date Mailed: Jul. 29, 2024), 10pp.

(Continued)

*Primary Examiner* — Nahida Sultana
(74) *Attorney, Agent, or Firm* — XSENSUS LLP

(57) ABSTRACT

An additive manufacturing method includes a step of measuring a temperature of an object of processing or a shaping material and outputting temperature data, a step of correcting basic commands based on a basic processing program and the temperature data, and determining post-correction commands including a material supply command, a heat source supply unit command, a drive command, and a gas supply command, a step of supplying the shaping material to a processing position of a shaped article based on the material supply command, a step of supplying a heat source to melt the shaping material supplied to the processing position based on the heat source supply unit command, a step of changing the relative position between the processing position and the shaped article based on the drive command, and a step of supplying, to the processing position, a shielding gas based on the gas supply command.

24 Claims, 15 Drawing Sheets

(51) Int. Cl.
  *B29C 64/227* (2017.01)
  *B29C 64/295* (2017.01)
  *B29C 64/35* (2017.01)
  *B29C 64/364* (2017.01)
  *B33Y 10/00* (2015.01)
  *B33Y 30/00* (2015.01)
  *B33Y 50/02* (2015.01)

(52) U.S. Cl.
  CPC ............ *B29C 64/295* (2017.08); *B29C 64/35* (2017.08); *B29C 64/364* (2017.08); *B33Y 10/00* (2014.12); *B33Y 30/00* (2014.12); *B33Y 50/02* (2014.12)

(58) Field of Classification Search
  CPC ....... B29C 64/364; B33Y 10/00; B33Y 30/00; B33Y 50/02; B22F 2999/00
  See application file for complete search history.

(56) References Cited

U.S. PATENT DOCUMENTS

| | | | |
|---|---|---|---|
| 5,981,901 A * | 11/1999 | La Rocca | B23K 26/142 219/121.84 |
| 11,285,567 B2 | 3/2022 | Fischer et al. | |
| 11,331,755 B2 | 5/2022 | Hattori et al. | |
| 2004/0026388 A1 * | 2/2004 | Staufer | B23K 9/173 219/137.2 |
| 2015/0283650 A1 * | 10/2015 | Aikawa | B23K 26/032 219/121.8 |
| 2018/0015561 A1 * | 1/2018 | Kawabe | B23K 35/0266 |
| 2018/0264726 A1 | 9/2018 | Shiomi et al. | |
| 2019/0061061 A1 | 2/2019 | Fischer et al. | |
| 2019/0070662 A1 | 3/2019 | Amaya et al. | |
| 2020/0030880 A1 | 1/2020 | Nagahama et al. | |
| 2020/0038983 A1 | 2/2020 | Sato et al. | |
| 2020/0086559 A1 * | 3/2020 | Sugiyama | B29C 64/165 |
| 2020/0101564 A1 * | 4/2020 | Shibazaki | B33Y 30/00 |
| 2021/0308794 A1 | 10/2021 | Hattori | |
| 2021/0394241 A1 | 12/2021 | Radermacher et al. | |

FOREIGN PATENT DOCUMENTS

| | | |
|---|---|---|
| JP | 2017-125483 A | 7/2017 |
| JP | 2018-126781 A | 8/2018 |
| JP | 2018-153935 A | 10/2018 |
| JP | 2019-044240 A | 3/2019 |
| JP | 2020-015944 A | 1/2020 |
| JP | 2020-100879 A | 7/2020 |
| JP | 6719691 B1 | 7/2020 |
| JP | 6758532 B1 | 9/2020 |
| KR | 20190024654 A | 3/2019 |
| WO | 2011162417 A1 | 12/2011 |
| WO | 2018/180135 A1 | 10/2018 |
| WO | 2020/084716 A1 | 4/2020 |

OTHER PUBLICATIONS

International Search Report and Written Opinion mailed on Dec. 28, 2020, received for PCT Application PCT/JP2020/038869, filed on Oct. 15, 2020, 11 pages including English Translation.

Chinese Office Action with a full English machine translation (CN Application No. 202080105200.7, Date Mailed: Mar. 28, 2025), 38pp.

* cited by examiner (a)

(b)

ADDITIVE MANUFACTURING METHOD, ADDITIVE MANUFACTURING APPARATUS, AND ADDITIVE MANUFACTURING SYSTEM

FIELD

The present disclosure relates to an additive manufacturing method, an additive manufacturing apparatus, and an additive manufacturing system for melting and stacking a shaping material in layers.

BACKGROUND

As a technique to form a shaped article, a technique called additive manufacturing (AM) is known in which a shaping material is heated and melted, and the molten shaping material is solidified to form a shaped article joined to a base material or the like. Additive manufacturing techniques include a method called directed energy deposition (DED) (hereinafter, referred to as DED) in which a shaping material is supplied to a shaping portion, and at the same time, the supplied shaping material is melted using a directional energy beam such as laser light, an electron beam, or a plasma arc.

Patent Literature 1 discloses an additive manufacturing learning model generation apparatus that generates a learning model for determining manufacturing conditions or estimating the state of a shaped article by machine learning using, as learning data, the state of the shaped article when the shaped article is irradiated with a light beam or after irradiation with a light beam, and the manufacturing conditions. The additive manufacturing learning model generation apparatus described in Patent Literature 1 is applied to a method of manufacturing a shaped article by irradiating metal powder placed in a layer with a light beam and heating the metal powder. The additive manufacturing learning model generation apparatus described in Patent Literature 1 is intended to provide an additive manufacturing learning model generation apparatus capable of easily determining manufacturing conditions for a shaped article and easily estimating the state of a shaped article, and the like.

CITATION LIST

Patent Literature

Patent Literature 1: Japanese Patent Application Laid-open No. 2020-15944

SUMMARY

Technical Problem

According to the additive manufacturing learning model generation apparatus described in Patent Literature 1, processing conditions are selected using a state estimation model based on machine learning. Therefore, disturbance occurs in a shaping material or a shaping portion when the amount of heat input to the shaping material, the amount of heat stored in the shaping portion, or the like is changed depending on the shape of each layer constituting a shaped article and manufacturing conditions. Examples of the disturbance include ignition, rapid vaporization of the shaping material or the shaping portion due to overheating, and deformation of the shaping material or the shaping portion due to overheating. Thus, there is a problem that disturbance, a deviation in the temperature of a shaping portion, or the like causes a decrease in the manufacturing precision of an additive-manufactured object.

Solution to Problem

An additive manufacturing method according to the present disclosure includes: a temperature measurement step of measuring a temperature of an object of processing or a shaping material and outputting the measured temperature as temperature data; a control step of correcting basic commands based on a basic processing program including the basic commands and processing conditions and the temperature data, and determining post-correction commands including a material supply command, a heat source supply unit command, a drive command, and a gas supply command; a shaping material supply step of supplying the shaping material to a processing position on a target surface of a shaped article based on the material supply command; a heat source supply step of supplying a heat source to melt the shaping material supplied to the processing position to the processing position based on the heat source supply unit command; a drive step of changing a relative position between the processing position and the shaped article based on the drive command; and a gas supply step of supplying, to the processing position, a shielding gas to prevent a reaction of the shaping material to the processing position based on the gas supply command.

An additive manufacturing apparatus according to the present disclosure includes: a temperature measurement unit to measure a temperature of an object of processing or a shaping material and output the measured temperature as temperature data; a control unit to correct basic commands based on a basic processing program including the basic commands and processing conditions and the temperature data, and determine post-correction commands including a material supply command, a heat source supply unit command, a drive command, and a gas supply command; a shaping material supply unit to supply the shaping material to a processing position on a target surface of a shaped article based on the material supply command; a heat source supply unit to supply a heat source to melt the shaping material supplied to the processing position to the processing position based on the heat source supply unit command; a drive unit to change a relative position between the processing position and the shaped article based on the drive command; and a gas supply unit to supply, to the processing position, a shielding gas to prevent a reaction of the shaping material to the processing position based on the gas supply command.

Advantageous Effects of Invention

According to the present disclosure, high-precision additive manufacturing can be performed.

DESCRIPTION OF EMBODIMENTS

Hereinafter, embodiments will be described in detail with reference to the drawings. Note that the embodiments described below are examples, and the scope of the present disclosure is not limited by the embodiments described below.

First Embodiment

Figure 1:
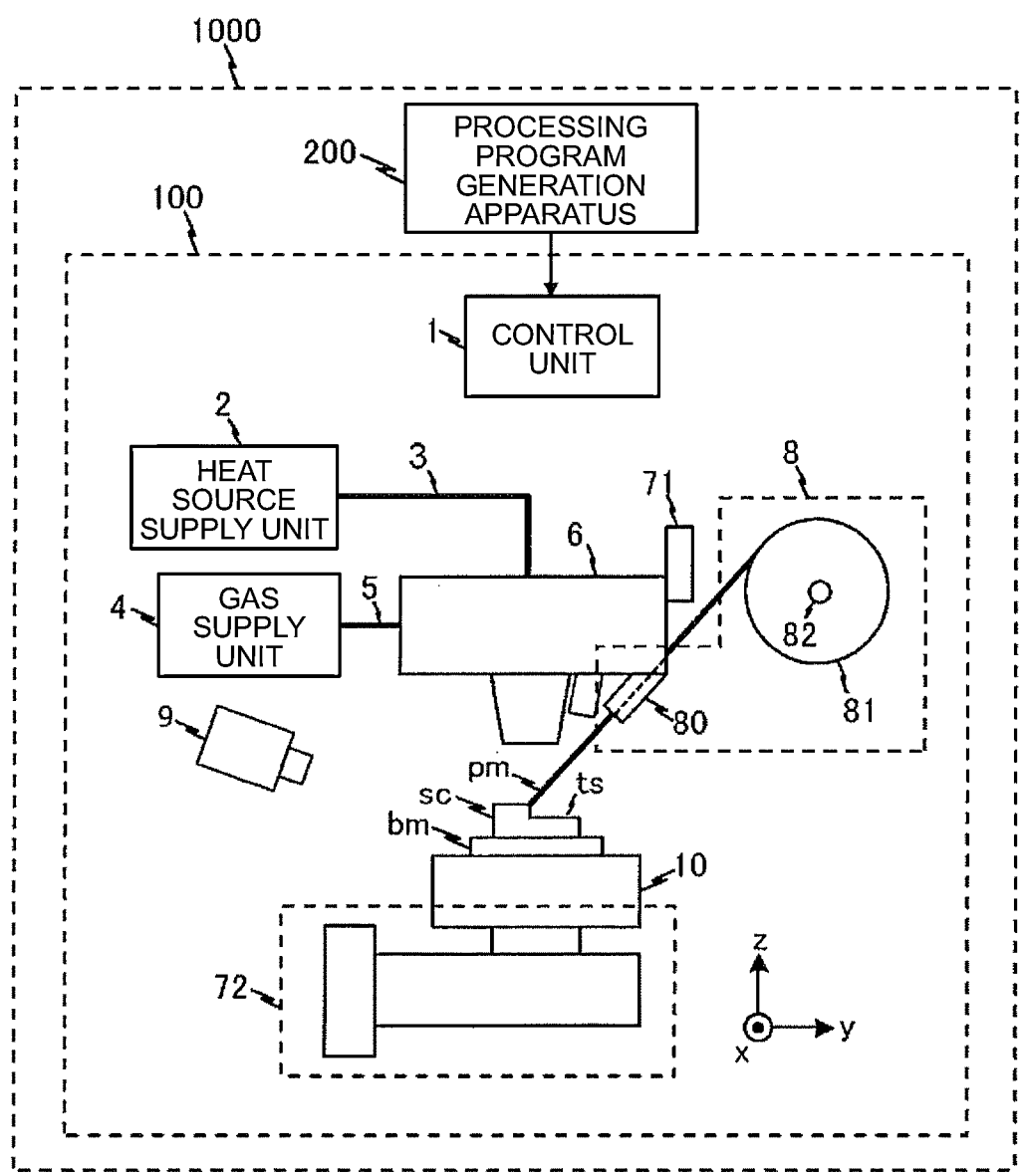
FIG. 1 is a diagram illustrating an example of a configuration of an additive manufacturing system according to a first embodiment of the present invention.
Figure 2:
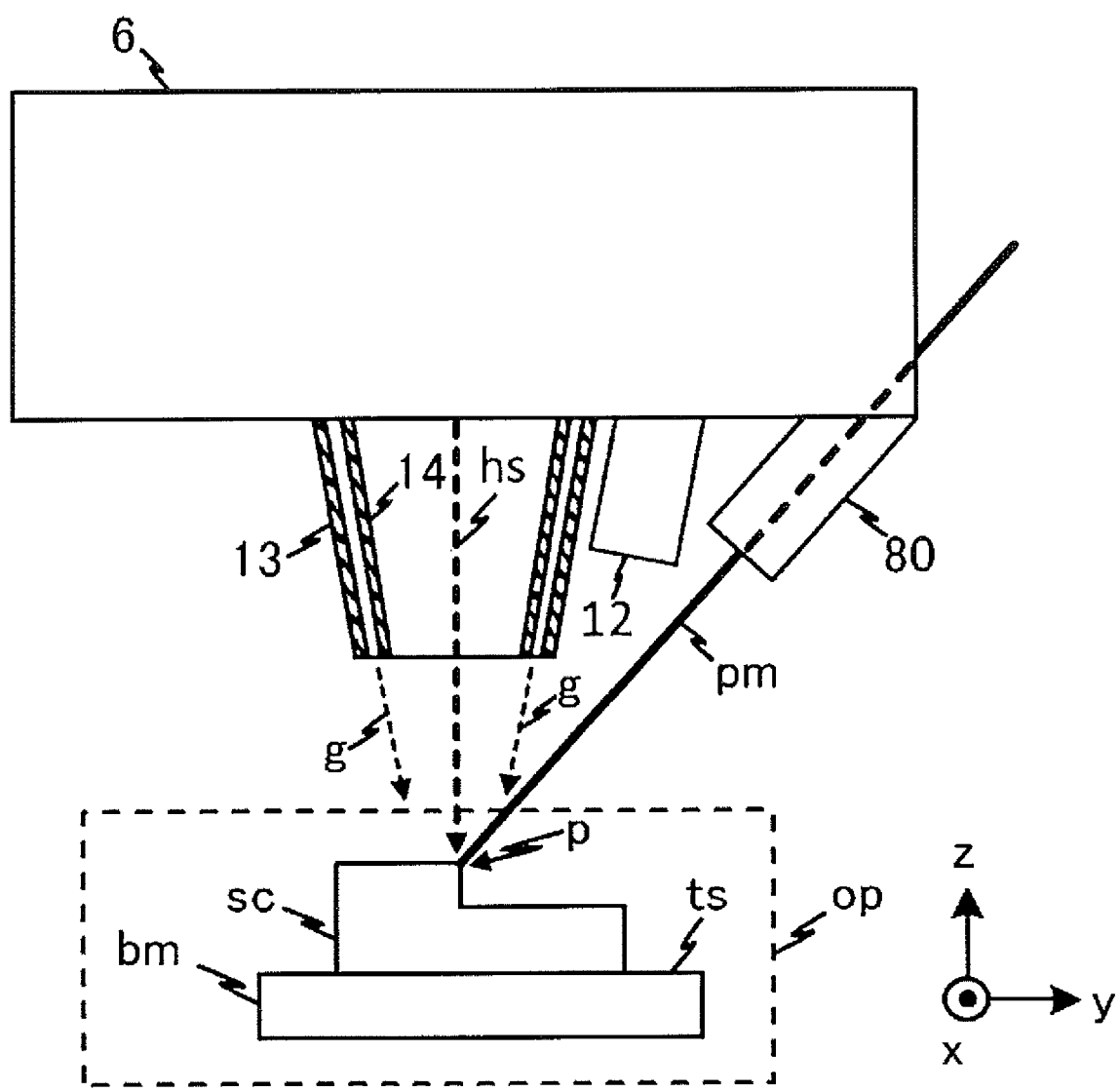
FIG. 2 is a diagram illustrating an example of a configuration of the surroundings of a processing head according to the first embodiment of the present invention.

FIG. 1 is a diagram illustrating a configuration of an additive manufacturing system according to the present embodiment. FIG. 2 is a diagram illustrating a configuration of the surroundings of a processing head according to the present embodiment. The directions of the axes of triaxial direct coordinate systems illustrated in FIGS. 1 and 2 agree. An additive manufacturing system 1000 includes an additive manufacturing apparatus 100 and a processing program generation apparatus 200. The additive manufacturing apparatus 100 is a DED additive manufacturing apparatus. The processing program generation apparatus 200 generates a basic processing program bpr. The additive manufacturing apparatus 100 performs additive processing in which a shaping material pm is heated and melted by a heat source hs, and the molten shaping material pm is added to a base material bm or the like.

The additive manufacturing apparatus 100 includes a control unit 1 that controls the additive manufacturing apparatus 100, a heat source supply unit 2 that supplies the heat source hs, a heat source path 3 that guides the heat source hs from the heat source supply unit 2 to a processing head 6, and a gas supply unit 4 that supplies a shielding gas g. The additive manufacturing apparatus 100 includes a pipe 5 that connects the gas supply unit 4 to the processing head 6, through which the shielding gas g passes. The additive manufacturing apparatus 100 includes the processing head 6 that supplies the heat source hs and the processing gas g to a processing position p.

The additive manufacturing apparatus 100 further includes a processing head drive unit 71 that moves the processing head 6, a shaping material supply unit 8 that supplies the shaping material pm to the processing position p, a temperature measurement unit 9 that measures temperature, a stage 10 to which the base member bm is fixed, a stage rotation mechanism 72 that rotates the stage 10, and a dust collector 12 that sucks smoke, dust, etc. The shaping material pm in FIG. 1 will be described as a wire-shaped metal.

In the configuration example of the present embodiment illustrated in FIG. 2, the stage 10 is fixed on the stage rotation mechanism 72. The base material bm is fixed on the stage 10. With the base material bm as a substrate, a bead is added to the base material bm at the time of additive manufacturing. Here, a bead refers to an object formed by the shaping material pm that has solidified after being melted by the supply of the heat source hs and added to an object of processing op or the like. A shaped article sc is formed by one or more beads.

Beads may include ball beads, line beads, etc. Here, a hemispherical bead is referred to as a ball bead, and a rod-like, that is, linear bead is referred to as a line bead. A process to shape a ball bead is referred to as point shaping, and a process to shape a line bead is referred to as line shaping. The processing position p refers to a position on the shaped article sc to which the additive manufacturing system 1000 adds a bead at each point of time. The additive manufacturing system 1000 may perform additive manufacturing only by point shaping, or may perform additive manufacturing only by line shaping, or may perform additive manufacturing using both point shaping and line shaping.

The base material bm illustrated in FIGS. 1 and 2 has a plate shape, but the shape of the base material bm is not limited to a plate shape. The shaped article sc refers to a shaped article formed on the base material bm by additive manufacturing. The base material bm and the shaped article sc are collectively referred to as the object of processing op. A surface of the object of processing op to which a bead is added is referred to as a target surface ts. The additive manufacturing apparatus 100 supplies the heat source hs to melt the shaping material pm. In parallel with this, a drive unit 7 changes the relative position between the processing position p and the shaped article sc based on a drive command dc. The drive unit 7 includes the processing head drive unit 71 and the stage rotation mechanism 72. The processing position p is changed by the rotation of the stage 10 by the stage rotation mechanism 72 and the movement of the processing head 6 by the processing head drive unit 71. Thus, a bead is added to the target surface ts to additive-manufacture the shaped article sc.

The heat source supply unit 2 supplies the heat source hs based on a heat source supply unit command lc. A heat source supply port 14 in FIG. 2 outputs the heat source hs, which is a heat source to heat and melt the processing material, to the object of processing op. The heat source hs may be anything that can heat the shaping material pm. Examples of the heat source hs include a laser beam, an electron beam, and an arc discharge. The heat source supply unit 2 and the processing head 6 are connected by the heat source path 3. The heat source hs generated by the heat source supply unit 2 is supplied to the heat source supply port 14 via the heat source path 3.

The gas supply unit 4 supplies the shielding gas g to the processing position p based on a gas supply command gc. Here, the shielding gas g is a gas for preventing the reaction of the shaping material pm. For example, the shielding gas g may be a gas blown to prevent a chemical reaction between oxygen, nitrogen, or hydrogen present in the air and the shaping material pm. Examples of the shielding gas g include inert gases such as helium, neon, and argon. Nitrogen may be used to prevent combustion that is the reaction with oxygen. The gas supply unit 4 and the processing head 6 are connected by the pipe 5. The gas supply unit 4 supplies the shielding gas g from a gas nozzle 13 to the object of processing op, based on the gas supply command gc. The shielding gas g may be ejected to the processing position p on the target surface ts to prevent oxidation of the shaped article sc, to prevent a chemical reaction with hydrogen, nitrogen, etc. contained in the air, and/or to cool a bead, for example. At the time of ball bead shaping, for example, the nozzle tip may be brought closer to a bead to increase cooling speed and/or oxidation prevention effect. The heat source supply port 14, a wire nozzle 80, and the gas nozzle 13 may be fixed to the processing head 6 in one piece to fix the positional relationships between the heat source supply port 14, the wire nozzle 80, and the gas nozzle 13. With this configuration, changes in processing conditions pc due to changes in the positional relationships between them may be prevented to achieve stable processing. The pipe 5 may be connected to the heat source supply port 14 so that both the heat source hs and the shielding gas g are output from the heat source supply port 14. In this configuration, the gas nozzle 13 is integrated with the heat source supply port 14, so that the costs of manufacturing the gas nozzle 13 and the heat source supply port 14 can be reduced, compared to those in the configuration of FIG. 1.

The shaping material supply unit 8 supplies the shaping material pm to the processing position p. In the example of FIG. 1, the shaping material supply unit 8 supplies a wire as the shaping material pm. The shaping material is not limited to a wire. Examples of the form of the shaping material pm include a linear form, a powder form, and a liquid form. Examples of the material of the shaping material pm include metal and resin. In the example of FIG. 1, a spool drive apparatus 82 rotates a wire spool 81 based on a material supply command and determined by the control unit 1, to let out the wire as the shaping material pm from the wire spool 81. The shaping material pm let out from the wire spool 81 passes through the wire nozzle 80 and is supplied to the processing position p. In the following description, the velocity of the shaping material pm moving from the wire spool 81 to an irradiation position is sometimes referred to as a wire supply volume velocity.

In the example of FIG. 1, the heat source hs is supplied from the heat source supply port 14 of the processing head 6 in the z-axis direction.

In the example of FIG. 1, the outlet of the wire nozzle 80 is located away from the heat source supply port 14 in an x-y plane. When the shaping material pm passes through the wire nozzle 80, the shaping material pm is advanced non-parallel to the heat source hs. The control unit 1 may control the traveling direction of the shaping material pm, the processing position p to which the shaping material pm is added, etc. by changing the angle between an orifice of the wire nozzle 80 through which the wire passes and the heat source supply direction.

The wire nozzle 80 may be installed coaxially with the heat source supply port 14. For example, the outer shapes of the wire nozzle 80, the gas nozzle 13, and the heat source supply port 14 are made the shapes of the side surfaces of truncated cones. The wire nozzle 80 may be disposed in the center, and the gas nozzle 13 and the heat source supply port 14 may be disposed around the wire nozzle 80. The heat source supply port 14 may be disposed in the center, and a plurality of wire nozzles 80 may be disposed around the heat source supply port 14, to make the laser scanning direction and the direction in which the shaping material pm is supplied uniform. A plurality of outlets of the shaping material pm may be provided to feed a plurality of different shaping materials pm from the respective outlets.

As the shaping material pm, a powder metal may be ejected from the nozzle to a heating position. When a powder metal is used as the shaping material pm, a method using the negative pressure of the shielding gas g, a method to pressure-jet the powder metal from a powder conveyance tube conveying the powder metal at a shaping timing, etc. can be used. The nozzle for ejecting the powder metal may be disposed so that the direction and position of the ejected powder metal substantially agree with those of the wire-shaped shaping material pm supplied to the processing position p illustrated in FIG. 2. In the method using the negative pressure of the shielding gas g, for example, an ejection port of the shielding gas is disposed around the orifice of a powder nozzle. Thus, a jet of the shielding gas may travel around the powder running out of the orifice of the powder nozzle, substantially parallel to the powder.

FIG. 2 illustrates cross sections of the gas nozzle 13 and the heat source supply port 14. The outer shapes of the gas nozzle 13 and the heat source supply port 14 are both the shapes of the side surfaces of truncated cones. When the outer shape of the gas nozzle 13 is referred to as a first truncated cone, and the outer shape of the heat source supply port 14 as a second truncated cone, the diameters of the upper base and the lower base of the second truncated cone are smaller than the diameters of the upper base and the lower base of the first truncated cone, respectively. The first truncated cone and the second truncated cone have shapes rotationally objective with respect to one rotation axis. Thus, the gas nozzle 13 and the heat source supply port 14 may have shapes rotationally objective with respect to one rotation axis. The heat source hs and the shielding gas g may be supplied on one axis to the processing position p. The shielding gas g may be ejected such that the shielding gas g surrounds a position where the heat source hs hits the processing position p. An angle adjustment mechanism for the processing head 6 may be provided. For example, the processing head 6 may be fixed to a swivel stage that rotates the processing head 6 with a direction parallel to the x-axis as a rotation axis. When the swivel stage is used, the processing head 6 can adjust the inclination angles of A- and B-axes in five-axis drive, thus eliminating the need to tilt the shaped article sc. When the shaped article sc is a large, heavy object, tilting the shaped article sc can increase the inertia of the additive manufacturing apparatus 100, making it hard to move precisely at high speeds. The provision of a rotation mechanism to the processing head 6 eliminates the need to change the angle of the shaped article sc, allowing processing to be performed more precisely at higher speeds.

The processing head drive unit 71 moves the processing head 6 based on the drive command dc. The processing head drive unit 71 in FIG. 1 moves the processing head 6 in each of the x-axis direction, the y-axis direction, and the z-axis direction perpendicular to each other. The processing head drive unit 71 may be a movement mechanism that enables translational movement in the three-axis directions. For example, the processing head drive unit 71 may include servomotors that move the processing head 6 in each of the x-axis direction, the y-axis direction, and the z-axis direction. The additive manufacturing apparatus 100 can change the irradiation position of the heat source hs on the target surface is by changing the relative position between the processing position p and the shaped article sc, using the processing head drive unit 71 and the stage rotation mechanism 72.

Figure 3:
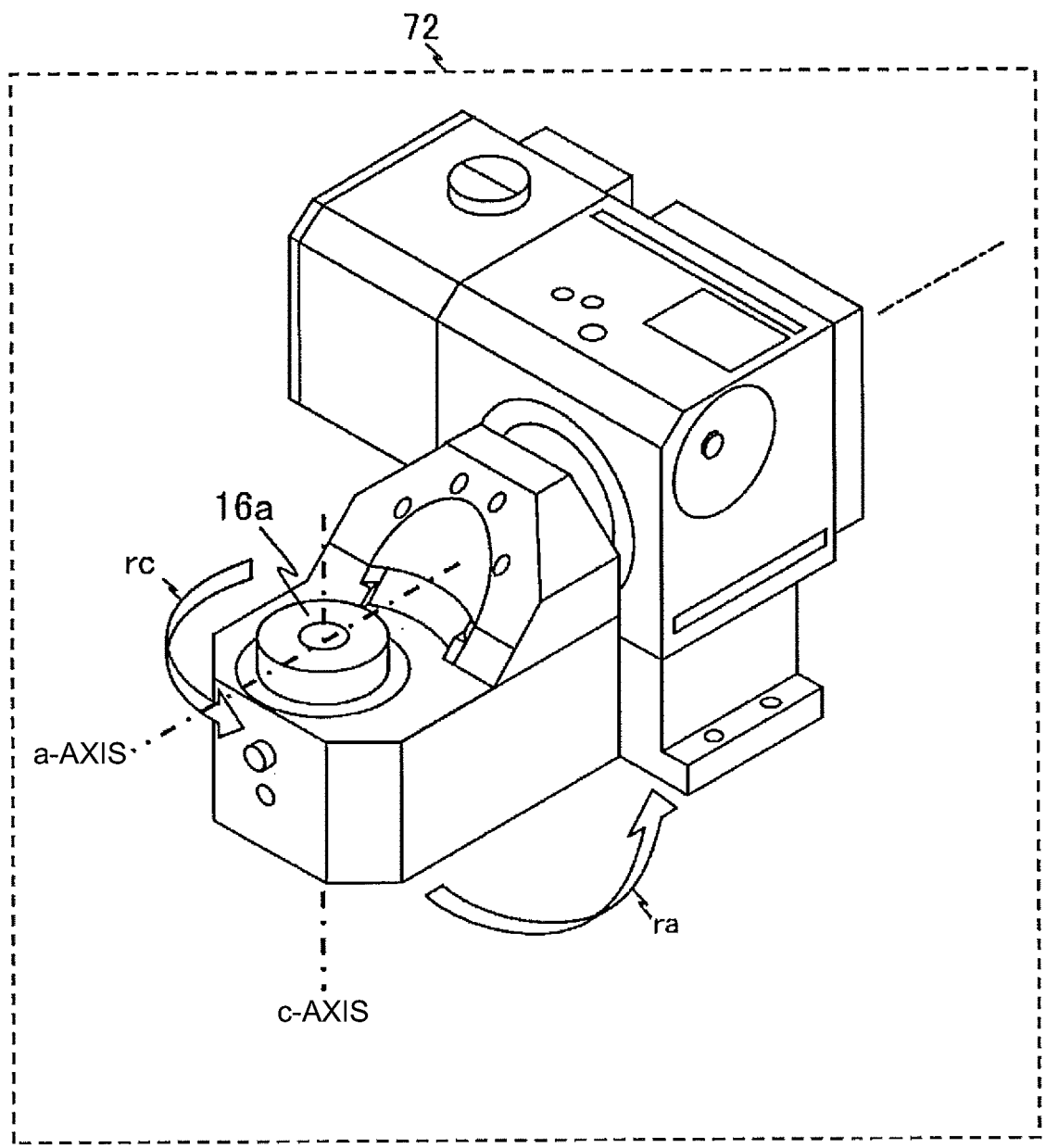
FIG. 3 is a diagram illustrating an example of a rotation mechanism according to the first embodiment of the present invention.

The stage rotation mechanism 72 rotates the stage based on the drive command dc. FIG. 3 is a diagram illustrating an example of the stage rotation mechanism according to the present embodiment. The stage 10 is mounted on a rotating member 16a of the stage rotation mechanism 72. The stage rotation mechanism 72 rotates the rotating member 16a, the stage 10, and the object of processing op about a first axis or a second axis, based on the drive command dc determined by the control unit 1. Here, the second axis is perpendicular to the first axis.

When the stage 10 rotates, the relative angle, position, etc. between the object of processing op and the processing head change. For example, the stage rotation mechanism 72 may include the rotating member 16a that rotates about a c-axis and an a-axis in FIG. 3 as rotation axes. The stage 10 may be fixed to the rotating member 16a. Further, the stage rotation mechanism 72 may rotate the rotating member 16a and the stage 10 based on the drive command dc.

For example, the stage rotation mechanism 72 may be configured to be able to perform two independent rotations of the rotating member 16a in a rotation direction rc with the c-axis as the rotation axis and in a rotation direction ra with the a-axis as the rotation axis. The directions of the a-axis and the c-axis can be taken as desired. For example, the a-axis may be parallel to the x-axis, and the c-axis may be parallel to the z-axis. For example, the stage rotation mechanism 72 may include servomotors to perform the two rotations in the rotation direction ra and the rotation direction rc. By using the stage rotation mechanism 72, for example, a complex shape such as a tapered shape may be additive-manufactured.

The temperature measurement unit 9 in the example of FIGS. 1 and 2 of the present embodiment is a temperature measuring device, and measures the temperature of the processing position p, the object of processing op, the shaping material pm, etc. and outputs the measured temperature as temperature data td.

The additive manufacturing apparatus 100 includes the dust collector 12 that collects dust generated from the processing position p by sucking an atmosphere around the processing position p. This can remove or reduce flying objects, smoke, etc. present around the processing position p during additive manufacturing. At this time, flying objects, smoking objects, etc. may be sucked together with the shielding gas g. The flying objects, the smoke, and the shielding gas g sucked may be collection-boxed in a collection box. If the shaping material pm or something is a substance having high oxidizability or a substance having high reactivity, a collection box filled with an inert gas may be used to prevent ignition, explosion, etc. It is also possible to perform the additive manufacturing method without a suction step of collecting dust generated from the processing position p by sucking an atmosphere around the processing position p. The additive manufacturing apparatus 100 may be constructed without the dust collector 12. However, to prevent ignition, explosion, etc., the additive manufacturing method of the present disclosure desirably includes the suction step. The additive manufacturing apparatus 100 desirably includes the dust collector 12.

Figure 4:
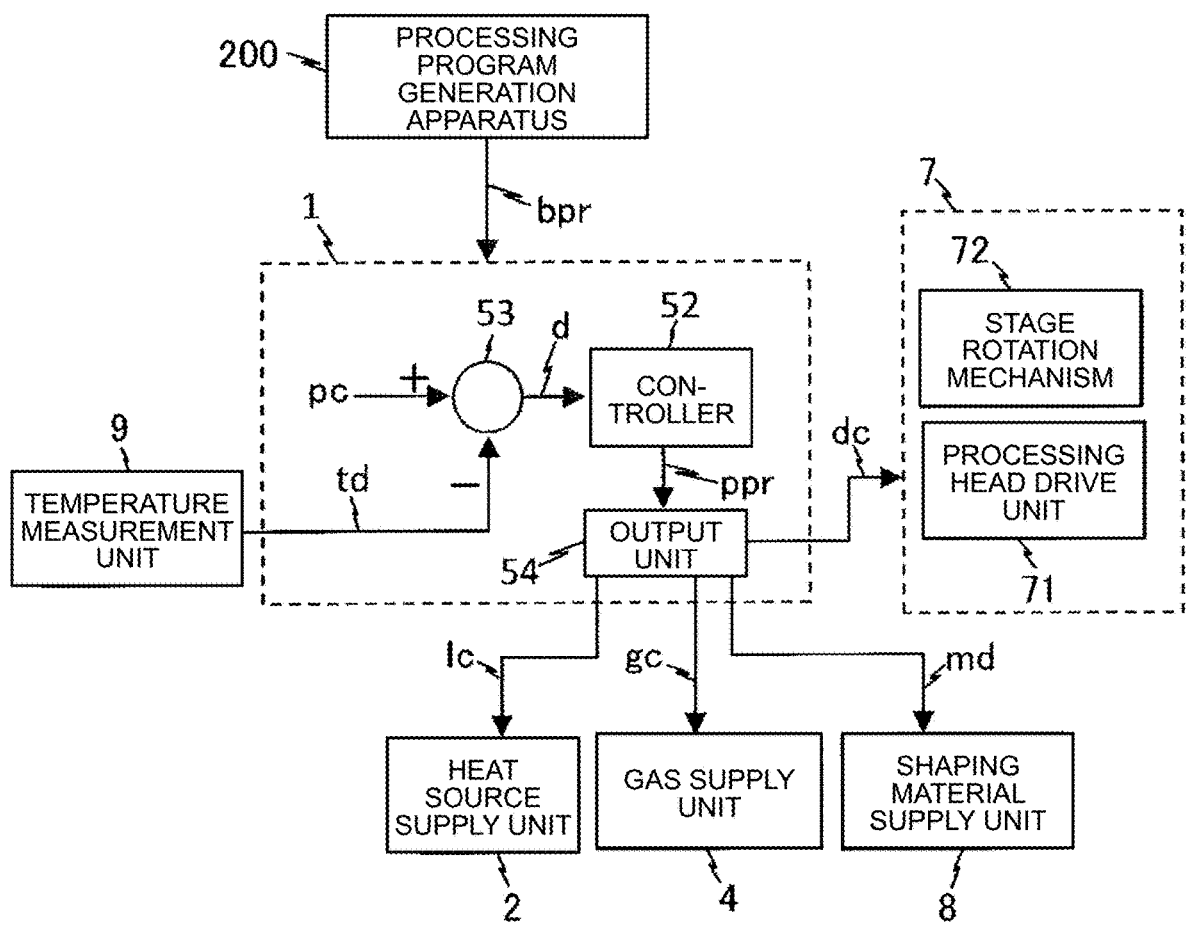
FIG. 4 is a block diagram illustrating a configuration of a control unit according to the first embodiment of the present invention.

The control unit 1 determines the heat source supply unit command lc, the material supply command md, the gas supply command gc, and the drive command dc as post-correction commands ccv, based on the basic processing program bpr and the temperature data td. FIG. 4 is a diagram illustrating an example of a configuration of the control unit according to the present embodiment. The control unit 1 includes a controller 52, a difference calculator 53, and an output unit 54. The control unit 1 acquires the basic processing program bpr from the processing program generation apparatus 200. Here, the basic processing program bpr includes basic commands bcv for performing additive manufacturing and processing conditions pc for performing the additive manufacturing. The basic commands bcv are commands before the control unit 1 performs correction, and are a pre-correction heat source supply unit command, a pre-correction material supply command, a pre-correction gas supply command, and a pre-correction drive command.

The drive command dc specifies a processing path. The processing path is a movement path to change the relative position between the object of processing op and the processing head 6. The processing path may be a path to form the shaped article sc in three dimensions. The processing path may be a path along which the irradiation position of the heat source hs moves. The control unit 1 may be, for example, a numerical control device. The processing conditions pc are conditions or parameters in processing performed by the additive manufacturing apparatus 100.

Examples of the processing conditions pc in the present embodiment include a set target value of the temperature of the processing position p, a set target value of the temperature of the shaping material pm supplied to the processing position p, a set target value of the temperature of the ts, and a set target value of the amount of supply of the shaping material pm per unit time. The processing conditions pc may be set to different values depending on the status of the additive manufacturing and the processing position p on the shaped article sc.

The control unit 1 acquires the temperature data td from the temperature measurement unit 9. The difference calculator 53 calculates a difference d between the processing conditions pc and the temperature data td. The controller 52 determines a post-correction processing program ppr based on the calculated difference d. The post-correction processing program ppr is a program having the same structure as the basic processing program bpr, and includes the processing conditions pc and the post-correction commands ccv to the individual units. The output unit 54 determines the post-correction commands ccv based on the post-correction processing program ppr. The post-correction commands ccv are commands after the correction by the control unit 1, and include the heat source supply unit command lc, the material supply command md, the gas supply command gc, and the drive command dc.

The operation of the control unit 1 in FIG. 4 will be described by an example. The difference calculator 53 calculates, as the difference d, a difference between the temperature of the processing position p included in the temperature data td and a target temperature value determined from the melting point, boiling point, or the like of the shaping material pm. The controller 52 determines the post-correction processing program ppr based on the calculated difference d. The output unit 54 outputs the heat source supply unit command lc. Consequently, in parallel with the additive manufacturing, the temperature of the processing position p can be controlled according to the monitored temperature value of the processing position p. Thus, the temperature of the processing position p, the shaping material pm, the object of processing op, etc. can be maintained at a value close to the set target value of the temperature included in the processing conditions pc.

For example, the temperature of the shaping material pm may be maintained at a temperature between the melting point and the ignition temperature of the shaping material pm. This allows the avoidance of ignition or the reduction of the number of occurrences of ignition during the execution of the additive manufacturing, thus allowing an improvement in the precision of the additive manufacturing. The temperature of the shaping material pm may be maintained at a temperature at which the shaping material pm has a viscosity enough to prevent the formation of droplets thereof. Here, droplet formation refers to a state in which the molten shaping material pm decreases in viscosity and forms droplets, thereby reducing processing precision. Thus, since droplet formation can be prevented during the execution of the additive manufacturing, the precision of the additive manufacturing can be improved. Furthermore, the number of occurrences of stopping the additive manufacturing apparatus 100 due to ignition, droplet formation, etc. can be reduced, so that the speed and efficiency of the additive manufacturing can be improved.

Here, as an example of operation to control the temperature of the shaping material pm, the processing position p, or the target surface ts, the control unit 1 may determine the heat source supply unit command lc to control the amount of supply of the heat source hs. The control unit 1 may determine the gas supply command gc to control the amount of the shielding gas g. A method of heating or cooling is not limited to the amount of the heat source hs or the flow rate of the shielding gas g. For example, the amount of heat input to the shaping material pm per unit amount may be adjusted by changing the angle of the wire nozzle 80. The amount of heat input or the amount of heat discharge may be adjusted by changing the order of shaping by changing the processing path, changing the amount of air sucked by the dust collector 12, etc. The control unit 1 may control the temperature of the shaped article sc, the shaping material pm, etc. by a combination of the parameters described above as examples.

When it is desired to lower the temperature of the processing position p, at least one of increasing the flow rate of the shielding gas g, reducing the amount of supply of the heat source hs, increasing the amount of supply of the shaping material pm, or reducing the movement speed of the processing position p may be performed. When it is desired to raise the temperature of the processing position p, any one of the following operations may be performed. That is, at least one of reducing the flow rate of the shielding gas g, increasing the amount of supply of the heat source hs, reducing the amount of supply of the shaping material pm, or increasing the movement speed of the processing position p may be performed. When ignition is observed based on the temperature data td, the above-described operations to lower the temperature may be performed to suppress the ignition.

The above-described control of each unit of the additive manufacturing apparatus 100 based on the temperature data td performed by the control unit 1 can also be performed in combination with the suction of smoke, flying objects, and dust by the dust collector 12. Since the occurrence of ignition, droplet formation, explosion, etc. is prevented by the operation of the dust collector 12, the control of the processing state by the control unit 1 is further improved in precision. For example, the accuracy of the temperature of the processing position p can be improved. Further, it is possible to reduce the deviation of each bead constituting an additive-manufactured object from a target shape. Furthermore, the temperature measurement unit 9 can output the more accurate temperature data td due to the prevention of occurrence of ignition, droplet formation, explosion, etc. that affect the measurement of the temperature data td as noise. Consequently, the precision of the control of each unit of the additive manufacturing apparatus 100 based on the temperature data td performed by the control unit 1 is improved, allowing higher-precision additive manufacturing to be performed.

Figure 5:
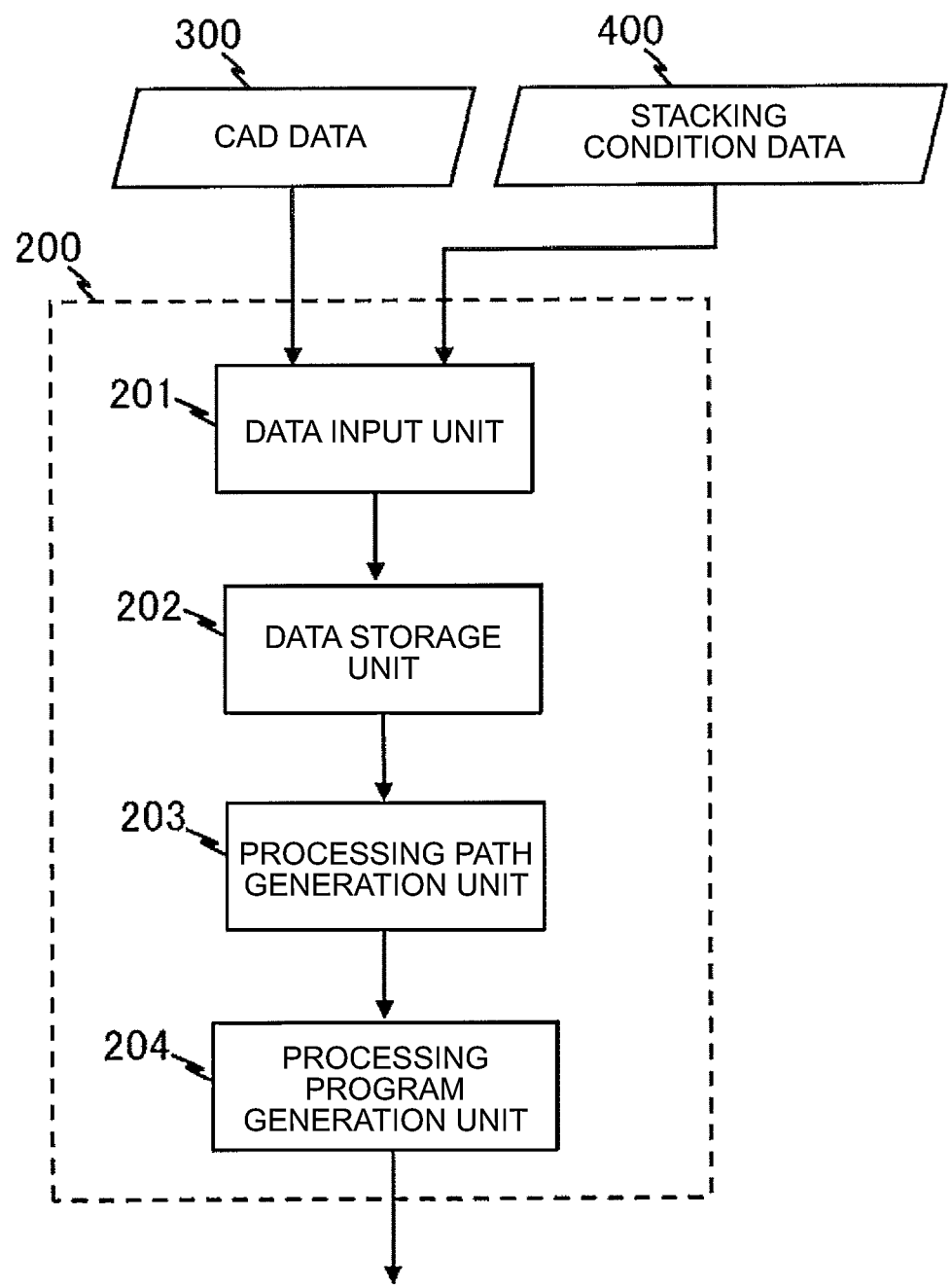
FIG. 5 is a block diagram illustrating an example of a configuration of a program generation unit according to the first embodiment of the present invention.

FIG. 5 is a block diagram illustrating an example of a configuration of the processing program generation apparatus 200 according to the present embodiment. The processing program generation apparatus 200 may be a computer-aided manufacturing (CAM) system that generates the basic processing program bpr for controlling the additive manufacturing apparatus 100. The processing program generation apparatus 200 includes a data input unit 201 that acquires data from the outside of the processing program generation apparatus 200, a data storage unit 202 that stores the data, a processing path generation unit 203 that generates a processing path, and a processing program generation unit 204 that generates the basic processing program bpr. In the configuration illustrated in FIG. 5, a data transfer path is illustrated in one direction, but the components of the processing program generation apparatus 200 may be configured to be able to mutually transmit and receive data.

The data input unit 201 acquires computer-aided design (CAD) data 300 and stacking condition data 400 input from the outside of the processing program generation apparatus 200 to the processing program generation apparatus 200. The data storage unit 202 acquires the CAD data 300 and the stacking condition data 400 from the data input unit 201 for storage. The CAD data 300 may be formed shape data indicating the finished shape of the shaped article sc to be additive-manufactured by the additive manufacturing apparatus 100. Only the CAD data 300 may be used. The formed shape data may be, for example, data representing the contour of the finished shape of the shaped article sc by numerical values.

The formed shape data is not limited to the data format illustrated here. The CAD data 300 may be any data as long as the processing program generation apparatus 200 can generate the basic processing program bpr based on the CAD data 300. The data input unit 201 may acquire the stacking condition data 400 in addition to the CAD data 300 and output the data to the data storage unit 202. The stacking condition data 400 may be information on beads. Examples of the information on beads include information indicating whether beads to be formed are ball beads or line beads, and information on the size, shape, specifications, etc. of beads. Information indicating the shape of line beads to be used in the generation of the basic processing program bpr is referred to as line bead formation information. Information indicating the shape of ball beads to be used in the generation of the basic processing program bpr is referred to as ball bead formation information. For example, a target value of the width of line beads, a target value of the height of line beads, etc. may be added to the stacking condition data 400 as the line bead formation information. Further, for example, a target value of the diameter of ball beads, a target value of the height of ball beads, etc. may be added to the stacking condition data 400.

The data storage unit 202 stores the CAD data 300 and the stacking condition data 400 transmitted from the data input unit 201. The processing path generation unit 203 receives the CAD data 300 and the stacking condition data 400 from the data input unit 201. Then, the processing path generation unit 203 generates a processing path based on the CAD data 300 and the stacking condition data 400. The processing path generation unit 203 may analyze the CAD data 300 and the stacking condition data 400 and generate a processing path based on the analysis results.

Here, a processing path is a path along which additive processing of line beads or ball beads is performed, and may be, for example, a tool path of the processing head 6. The processing program generation unit 204 acquires the processing path. The processing program generation unit 204 generates the basic processing program bpr from the acquired processing path. The basic processing program bpr may specify the processing path by specifying a trajectory of the processing head 6 for forming line beads or ball beads. The processing program generation unit 204 may sort the processing path into portions where additive processing using ball beads is performed and portions where additive processing using line beads is performed, based on bead information included in the stacking condition data. The processing program generation unit 204 may sort the processing path using determination criteria for proper use of line beads and ball beads held inside. As illustrated in FIG. 4, the control unit 1 acquires the basic processing program bpr from the processing program generation unit 204. The above is an example of the configuration of the processing program generation apparatus 200.

Figure 6:
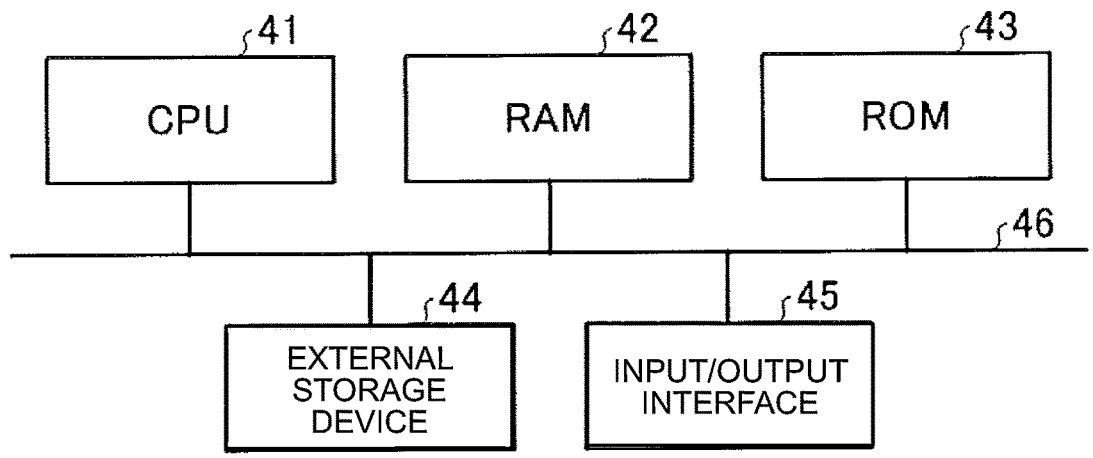
FIG. 6 is a diagram illustrating an example of a hardware configuration for implementing functions of the control unit by processing circuitry and a storage device according to the first embodiment of the present invention.

FIG. 6 is a diagram illustrating an example of a hardware configuration for implementing the functions of the control unit 1 by processing circuitry and a storage device according to the present embodiment. The control unit 1 is implemented using, for example, a control program that is a program for performing the control of the additive manufacturing apparatus 100. The control unit 1 includes a central processing unit (CPU) 41 that executes various types of processing, random-access memory (RAM) 42 including a data storage area, read-only memory (ROM) 43 that is nonvolatile memory, an external storage device 44, and an input/output interface 45 for inputting information to the control unit 1 and outputting information from the control unit 1. The units illustrated in FIG. 4 are connected to each other via a bus 46.

The CPU 41 executes programs stored in the ROM 43 and the external storage device 44. The control of the additive manufacturing apparatus 100 by the control unit 1 is implemented using the CPU 41. The external storage device 44 is a hard disk drive (HDD) or a solid-state drive (SSD). The external storage device 44 stores a control program and various data. The ROM 43 stores software or a program to control hardware that is a boot loader such as the Basic Input/Output System (BIOS) or the Unified Extensible Firmware Interface (UEFI), which is a program for basic control of a computer or a controller that is the control unit 1. The control program may be stored in the ROM 43.

The programs stored in the ROM 43 and the external storage device 44 are loaded into the RAM 42. The CPU 41 develops the control program in the RAM 42 and executes the various types of processing. The input/output interface 45 is an interface for connection with an apparatus outside the control unit 1. The post-correction processing program bpr is input to the input/output interface 45. The input/output interface 45 outputs various commands. The control unit 1 may include input devices such as a keyboard and a pointing device, and an output device such as a display. The control program may be stored in a computer-readable storage medium. The control unit 1 may store the control program stored in the storage medium in the external storage device 44. The storage medium may be a portable storage medium that is a flexible disk or a flash memory that is a semiconductor memory. The control program may be installed on a computer or a controller that is the control unit 1 from another computer or a server device via a communication network.

Figure 7:
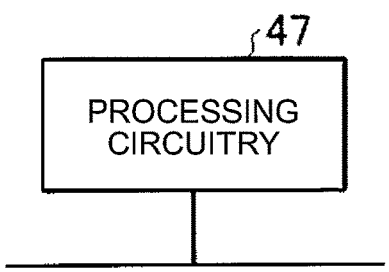
FIG. 7 is a diagram illustrating an example of a hardware configuration for implementing functions of the control unit by dedicated processing circuitry according to the first embodiment of the present invention.

FIG. 7 is a diagram illustrating an example of a hardware configuration for implementing the functions of the control unit 1 by dedicated processing circuitry according to the present embodiment. The functions of the control unit 1 can also be implemented by processing circuitry 47 that is dedicated hardware illustrated in FIG. 5. The processing circuitry 47 is a single circuit, a combined circuit, a programmed processor, a parallel-programmed processor, an application-specific integrated circuit (ASIC), a field-programmable gate array (FPGA), or a combination of them. Part of the functions of the control unit 1 may be implemented by dedicated hardware, and the other part may be implemented by software or firmware.

The functions of the processing program generation apparatus 200 can be implemented by hardware having the configuration illustrated in FIG. 6 executing a control program that is a program for performing the control of the processing program generation apparatus 200. Alternatively, the functions of the processing program generation apparatus 200 can be implemented by the control program using the processing circuitry 47 that is the dedicated hardware illustrated in FIG. 7.

Figure 8:
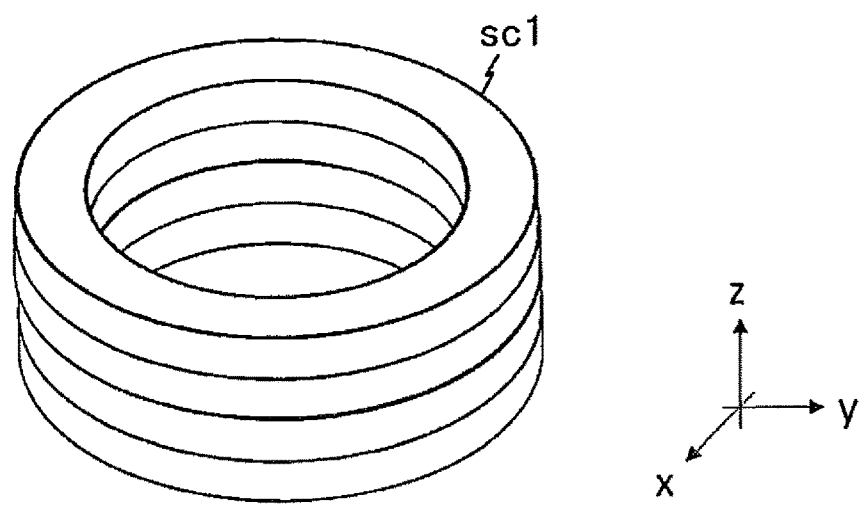
FIG. 8 is a diagram illustrating an example of a shaped article additive-manufactured by the additive manufacturing system according to the first embodiment of the present invention.
Figure 9:
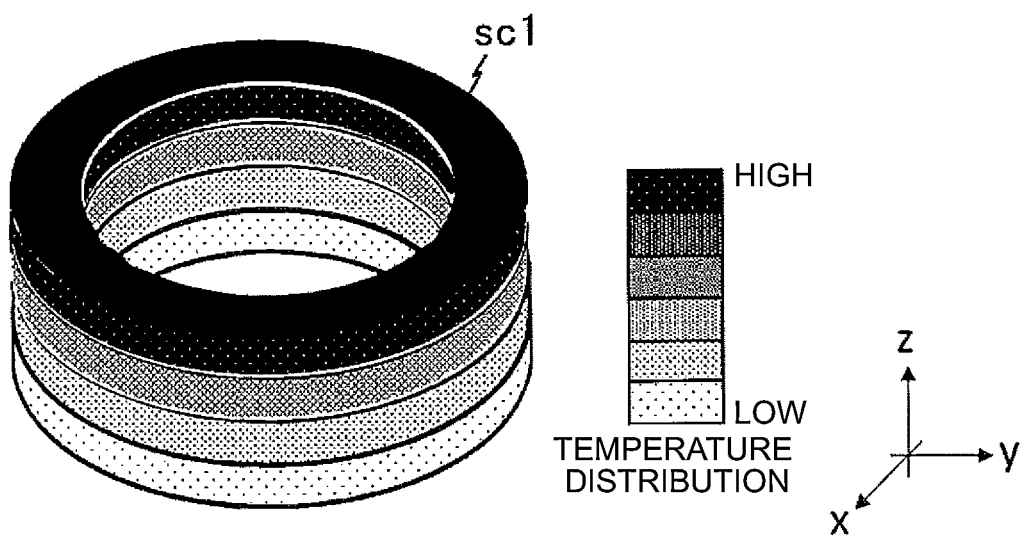
FIG. 9 is a diagram illustrating an example of the distribution of the temperature of a shaped article being additive-manufactured by the additive manufacturing system according to the first embodiment of the present invention.

Next, manufacturing precision during additive manufacturing will be described. FIG. 8 is a diagram illustrating an example of a shaped article additive-manufactured by the additive manufacturing system of the present embodiment. FIG. 9 is a diagram illustrating an example of the distribution of the temperature of the shaped article being additive-manufactured by the additive manufacturing system of the present embodiment. A shaped article sc1 in FIG. 9 is the same as the shaped article sc1 illustrated in FIG. 8. The shaped article sc1 has a cylindrical shape and is stacked in layers in the positive direction of the z axis of a triaxial direct coordinate system illustrated in the figure. In the following description, the positive direction of the z axis is sometimes referred to as a direction from the bottom to the top. The shaped article sc1 includes a plurality of layers perpendicular to the z axis. Solid lines are drawn between the layers.

The top surface of FIG. 9 is filled with black, indicating that the heat source hs is supplied to the top surface, heating the top surface. In FIG. 9, the temperature distribution is indicated by hatching etc. As indicated by this temperature distribution, the temperature of the shaped article sc1 differs depending on both a shaping portion that is the processing position p, and a shaping height that is the height of the processing position p. In the example of FIG. 9, as the shaping height increases, heat discharged to the base material bm decreases, and the amount of heat stored in the shaped article sc1 increases. As a result, if stacking is performed consecutively with heat input by the heat source hs and heat discharge by the shielding gas g maintained at the same levels, an upper-layer portion of the shaped article sc1 often has higher temperatures than a lower-layer portion. In this case, if the post-correction commands ccv are determined in accordance with the state of lower layers, the upper layer portion has temperatures higher than an appropriate temperature, that is, tends to become overheated.

When the shaped article sc1 has become overheated, droplet formation due to a decrease in the viscosity of the shaping material pm, sagging of the shaping material pm, or the like can occur, causing a deviation from a target formed shape in the shape of the shaped article sc1. For example, if the basic commands bcv included in the basic processing program bpr are used as they are without being corrected as the post-correction commands ccv, the above deviation can occur. Even if a deviation in height per layer in additive manufacturing is as small as some pm to some tens of pm, additive manufacturing in which some hundred layers are stacked can result in a large difference between a final stacked shape and a target shape.

As described above, the additive manufacturing method of the present embodiment includes a temperature measurement step of measuring the temperature of the object of processing op or the shaping material pm and outputting the measured temperature as the temperature data td, a control step of correcting the basic commands bcv based on the basic processing program bpr including the basic commands bcv and the processing conditions pc and the temperature data td, and determining post-correction commands including the material supply command md, the heat source supply unit command lc, the drive command dc, and the gas supply command gc, a shaping material supply step of supplying a shaping material to a processing position on a target surface of a shaped article based on the material supply command md, a heat source supply step of supplying a heat source to melt the shaping material supplied to the processing position to the processing position based on the heat source supply unit command lc, a drive step of changing the relative position between the processing position and the shaped article based on the drive command dc, and a gas supply step of supplying to the processing position a shielding gas to prevent the reaction of the shaping material to the processing position based on the gas supply command gc.

The additive manufacturing method of the present embodiment further includes a suction step of sucking an atmosphere around the processing position.

The additive manufacturing apparatus 100 of the present embodiment includes the temperature measurement unit 9 that measures the temperature of the object of processing op or the shaping material pm and outputs the measured temperature as the temperature data td, the control unit 1 that corrects the basic commands bcv based on the basic processing program bpr including the basic commands bcv and the processing conditions pc and the temperature data td, and determines post-correction commands including the material supply command md, the heat source supply unit command lc, the drive command dc, and the gas supply command gc, the shaping material supply unit 8 that supplies the shaping material to a processing position on a target surface of a shaped article based on the material supply command md, a heat source supply unit that supplies a heat source to melt the shaping material supplied to the processing position to the processing position based on the heat source supply unit command lc, the drive unit 7 that changes the relative position between the processing position and the shaped article based on the drive command dc, and the gas supply unit 4 that supplies to the processing position a shielding gas that is a gas to prevent the reaction of the shaping material to the processing position based on the gas supply command gc.

The additive manufacturing system 1000 of the present embodiment includes the additive manufacturing apparatus 100 and the processing program generation apparatus 200 that generates the basic processing program bpr.

The control unit 1 determines the post-correction commands ccv based on the basic processing program bpr and the temperature data td, so that the temperature of the processing position p can be brought closer to a target value. Further, it is possible to prevent the occurrence of ignition, droplet formation, explosion, etc.

Consequently, the precision of additive manufacturing can be improved. By including the processing program generation apparatus 200, the basic processing program bpr according to the formed shape data indicating a finished shape can be generated, so that the precision of additive manufacturing can be improved.

Further, according to the present embodiment, by including the dust collector 12 that sucks an atmosphere containing dust, smoke, etc., ignition, explosion, etc. can be prevented. Consequently, the processing precision can be further improved. Furthermore, the gas supply unit 4 that supplies the shielding gas g to the processing position p is included. Thus, additive manufacturing is performed under an atmosphere of the shielding gas g, so that oxidation, ignition, explosion, etc. during the manufacturing can be prevented. Then, the occurrence of manufacturing defects due to oxidation, ignition, explosion, etc. during the manufacturing is prevented, so that the precision of the additive manufacturing can be improved. Since the supply of the shielding gas g can prevent ignition, explosion, etc., the temperature measurement unit 9 can acquire the temperature data td with higher accuracy.

Furthermore, it is possible to prevent generation of vibrations, abrupt variations in temperature, sudden changes in atmosphere etc., and so on, so that the determination of the post-correction commands ccv based on the temperature data td performed by the control unit 1 can be performed with higher precision. According to the present embodiment, since the shielding gas g, temperature control, etc. are performed, a material that is difficult to use as the shaping material pm due to the possibility of causing dust explosion may be able to be used as the shaping material pm. As described above, according to the present embodiment, the precision of additive manufacturing can be improved.

Second Embodiment

Figure 10:
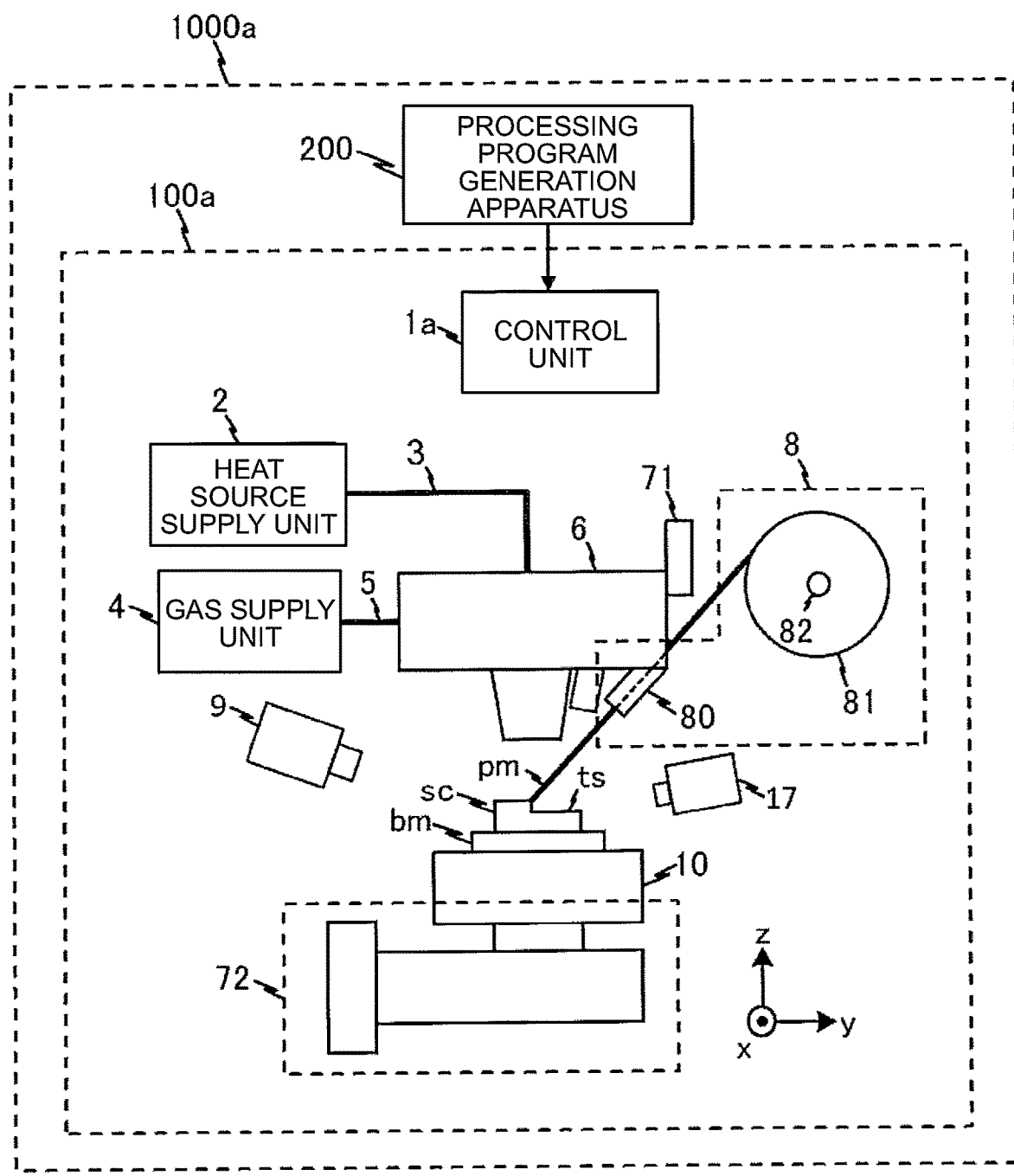
FIG. 10 is a diagram illustrating an example of a configuration of an additive manufacturing system according to a second embodiment of the present invention.

FIG. 10 is a diagram illustrating an example of a configuration of an additive manufacturing system according to the present embodiment. In the description of the present embodiment, components, signals, and others identical or corresponding to the components, signals, and others of the first embodiment are denoted by the same reference numerals. An additive manufacturing apparatus 100a includes a light detection unit 17 in addition to the configuration of the additive manufacturing apparatus 100. The additive manufacturing apparatus 100a includes a control unit 1a in place of the control unit 1 of the first embodiment.

The light detection unit 17 detects scattered light that is light generated from the processing position p or light supplied from the outside scattered, transmitted light, or the like, and outputs the detected light as a light detection result lr. The light detection result lr may be a numerical value quantitatively indicating the intensity of light. The light detection unit 17 may output a signal indicating the presence of light detection when light of intensity higher than or equal to a certain threshold is generated, and output a signal indicating the absence of light detection when the intensity is lower than or equal to the threshold. A plurality of light intensity thresholds may be provided in stages. The light detection unit 17 may output a different signal in each stage, depending on whether the plurality of thresholds are exceeded or not. The control unit 1a may perform operation according to the output signal. Examples of the scattered light include light scattered by the shaping material pm, a flying object, smoke, etc. Examples of the transmitted light include light transmitted through smoke, the shielding gas, the atmosphere, etc.

When the heat source hs other than a laser beam is used, an observation light source may be added to the additive manufacturing apparatus 100a, and the light detection unit 17 may detect light from the observation light source. When the observation light source is used, the control unit 1a may detect generation of smoke or the like from a reduction, variation, or the like in scattered light. Alternatively, light may be emitted from an external light source to the vicinity of the processing position p to detect light scattered by the stacking material pm or a bead to detect the presence or absence of droplet formation from a change in the scattered light. Although FIG. 10 illustrates a case where the light detection unit 17 transmits the light detection result lr to the control unit 1a by wireless communication, the light detection unit 17 may transmit the light detection result lr to the control unit 1a by wired communication.

Figure 11:
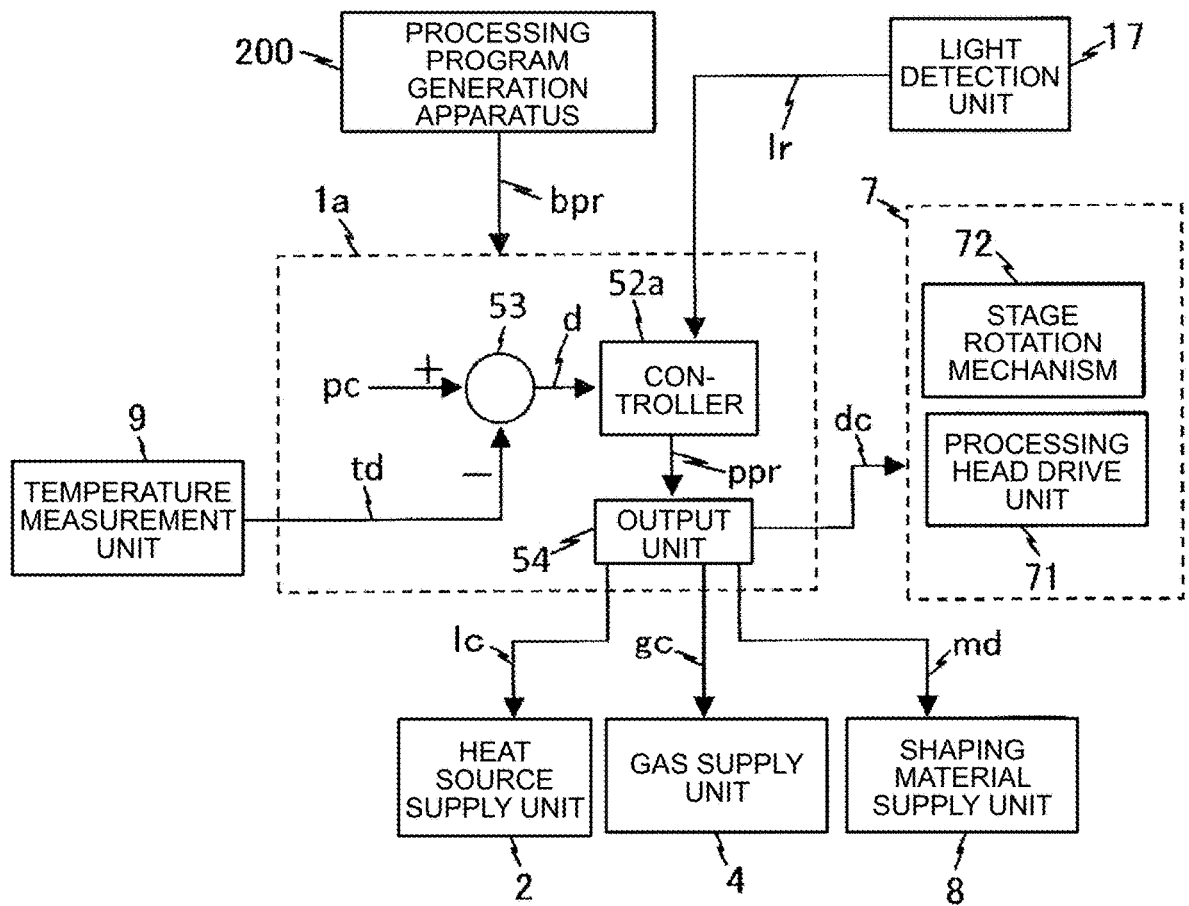
FIG. 11 is a diagram illustrating an example of a configuration of a control unit according to the second embodiment of the present invention.

FIG. 11 is a block diagram illustrating an example of a configuration of the control unit according to the present embodiment. The control unit 1a illustrated in FIG. 11 is different from the control unit 1 in that a controller 52a is included in place of the controller 52 of the control unit 1. While the control unit 1 in FIG. 1 acquires only the temperature data td, the control unit 1a in FIG. 11 acquires the light detection result lr in addition to the difference d. Based on the light detection result lr, the control unit 1a detects the presence or absence of occurrence of ignition, droplet formation, explosion, smoking, etc., or the state of ignition, droplet formation, explosion, smoking, etc. Hereinafter, a state in which the control unit 1a does not detect the occurrence of ignition, droplet formation, explosion, smoking, etc. is referred to as a steady state. A case where the control unit 1a detects the occurrence of ignition, droplet formation, explosion, smoking, etc. is referred to as an anomalous state.

As illustrated in FIG. 11, the control unit 1a operates like the control unit 1 when the control unit 1a has found the steady state. That is, like the controller 52, the controller 52a outputs the post-correction processing program ppr based on the temperature data td. The output unit 54 outputs commands based on the post-correction processing program ppr. That is, the output unit 54 determines the post-correction commands ccv based on the post-correction processing program ppr.

On the other hand, even when the anomalous state has been found based on the light detection signal lr, the controller 52a determines the post-correction processing program ppr, but the post-correction commands ccv in the anomalous state are different from the post-correction commands ccv in the normal state. For example, when ignition has occurred, processing may be stopped. The post-correction commands ccv in the anomalous state may be commands to reduce the temperature of the processing position p to suppress the ignition as described in the first embodiment. The post-correction commands ccv may reflect the anomalous state. For example, in addition to the post-correction commands ccv in the normal state in which smoke, ignition, or the like does not exist, the post-correction commands ccv in the anomalous state in which smoke, ignition, or the like exists are stored in advance in the basic processing program bpr. Further, a conditional branch may be set in the basic processing program bpr to select and execute either the post-correction commands ccv in the normal state or the post-correction commands ccv in the anomalous state.

The controller 52a may select a command to be changed between the post-correction commands ccv in the normal state and the post-correction commands ccv in the anomalous state from the heat source supply unit command lc, the material supply command md, the gas supply command gc, and the drive command dc. At the time of the selection, one or more of the above commands may be selected according to the temperature data td and the light detection result lr. One or more commands to be changed between the basic commands bcv and the post-correction commands ccv may be selected, according to the temperature data td and the light detection result lr. The controller 52a may select one or more commands to be changed between the post-correction commands ccv in the normal state and the post-correction commands ccv in the anomalous state, according to the state of the processing position p on the processing path. The controller 52a may select one or more commands to be changed between the basic commands bcv and the post-correction commands ccv, according to the state of the processing position p on the processing path.

Examples of the state of the processing position p on the processing path described above include, for example, a case where the processing position p is at an end point of a line bead, a case where the processing position p is at the intersection of line beads, and a case where the processing position p is at a bend of a line bead. A change command may be added to the basic processing program bpr so that the control unit 1 automatically selects the change command according to the state of the processing position p indicated by the basic processing program bpr. Alternatively, an input unit to input a change command from the outside may be provided to the control unit 1a so that the control unit 1a selects the change command according to the input from the outside.

As described above, the additive manufacturing method of the present embodiment includes a light detection step of detecting light from the processing position p and outputting the detected light as the light detection result lr. In the control step, the post-correction commands ccv are determined based on the basic processing program bpr, the temperature data td, and the light detection result lr. In this control step, an anomaly is detected based on the light detection result lr. When an anomaly is detected, at least one of increasing the amount of supply of the shielding gas g, reducing the amount of supply of the heat source hs, increasing the amount of supply of the shaping material pm, or reducing the rate of change in the relative position is performed. With this, the occurrence of an anomalous state such as ignition may be prevented.

Thus, the control unit 1a can control the heat source supply unit command lc, the material supply command md, the gas supply command gc, the drive command dc, etc. according to the light detection result lr. Then, the control unit 1a can detect an anomalous state such as ignition, droplet formation, explosion, or smoking caused by the overheating of the processing position p, and control the amount of supply of the heat source h, the supply rate of the shaping material pm, the flow rate of the shielding gas g, the movement of the processing head 6, the rotation of the stage 10, etc. As described above, according to the present embodiment, the precision of additive manufacturing can be improved.

Third Embodiment

The configuration of an additive manufacturing system of the present embodiment is the same as that of the additive manufacturing system 1000 described in the first embodiment. Thus, description will be made using the reference numerals assigned to the components, signals, and others described in the first embodiment. When additive manufacturing is interrupted, the control unit 1 of the present embodiment reheats the object of processing op formed before the interruption of the additive manufacturing, based on the temperature data td. After the reheating, the additive manufacturing is resumed.

In the following description, it is assumed that an option of the post-correction commands ccv at the time of reheating and a conditional branch for selecting the option are added to the basic processing program bpr, and the control unit 1 determines the post-correction commands ccv when instructed to perform reheating by the basic processing program bpr. On the other hand, the present embodiment is not limited to this operation. For example, the post-correction commands ccv at the time of reheating may be stored in the control unit 1 in advance. The timing at which the post-correction commands ccv at the time of reheating are issued in accordance with the post-correction processing program ppr at the time of reheating may be added to the basic processing program bpr, or may be the timing at which the control unit 1 determines that reheating will be performed, according to the temperature data td or the like. A conditional branch to change an action according to the temperature data td may be added to the basic processing program bpr so that the control unit 1 executes a different post-correction processing program ppr according to the temperature data td.

The resumption of additive manufacturing is operation to resume the supply of the shaping material pm to the processing position p and perform the supply of the heat source hs to the processing point p. In addition to the resumption of the supply of the shaping material pm and the heat source hs to the processing point p, the change of the relative position between the processing position p and the shaped article sc may be resumed. When additive manufacturing is interrupted, the processing head 6 may be moved and retracted from the vicinity of the object of processing op for the purpose of avoiding a collision between the processing head 6 and the object of processing op formed before the interruption of the additive manufacturing, etc. In this case, at the start of heating during the interruption of the additive manufacturing or at the start of the additive manufacturing, the processing head 6 may be returned to the vicinity of the object of processing op, or the relative position between the processing head 6 and the shaped article sc may be returned to a state at the time of the interruption. Then, heating or resumption of the additive manufacturing may be started.

Figure 12:
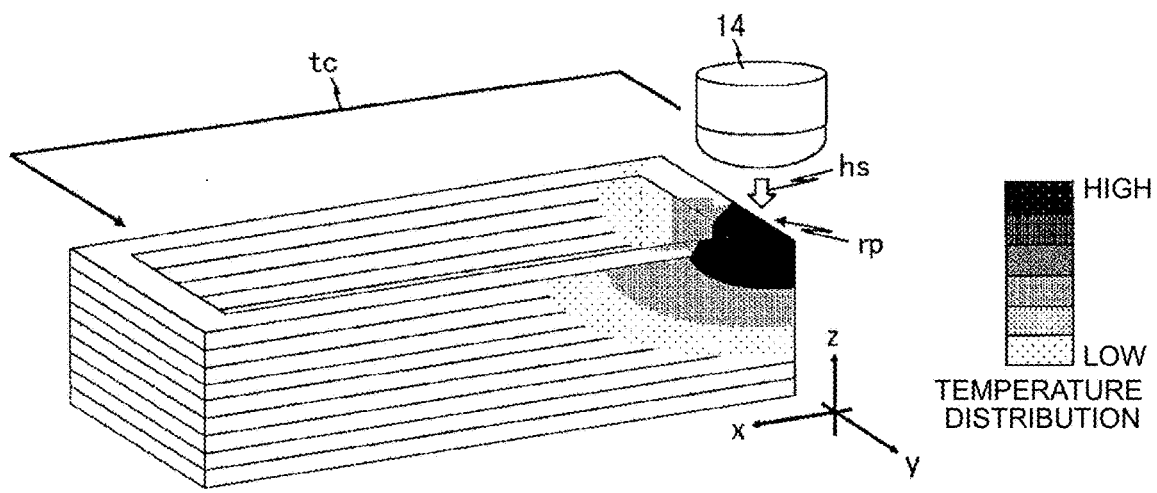
FIG. 12 is a diagram illustrating an example of the distribution of the temperature of an object of processing when additive manufacturing that has been interrupted is resumed, heating a manufacturing resumption portion, according to a third embodiment of the present invention.

The processing position p at the time of resuming manufacturing is referred to as a manufacturing resumption portion rp. FIG. 12 is a diagram illustrating an example of the distribution of the temperature of an object of processing when the manufacturing resumption portion rp is heated at the time of resumption of additive manufacturing that has been interrupted according to the present embodiment. FIG. 12 illustrates the heat source supply port 14 and an arrow indicating the direction of supply of the heat source hs. A trajectory command tc is also illustrated which specifies the trajectory of movement of the processing position p included in the basic processing program bpr. The trajectory command tc illustrated in FIG. 12 is a trajectory drawn with a single stroke without a brake and without a backward motion, in other words, a one-stroke trajectory. The trajectory command tc is not limited to the form in FIG. 12 and is not limited to a trajectory drawn with a single stroke. FIG. 12 illustrates the temperature distribution by hatching. In the shaped article sc, the temperature at and in the vicinity of the manufacturing resumption portion rp is high, and the temperature decreases with increasing distance therefrom. The shaped article sc includes a plurality of layers. The boundaries between the plurality of layers are illustrated by solid lines perpendicular to the z axis. The shaped article sc is additive-manufactured layer by layer from the bottom to the top.

The processing program generation apparatus 200 in the present embodiment determines the heat source supply unit command lc in the processing program bpr, based on the position of the manufacturing resumption portion rp in the object of processing op, and the cross-sectional shape of the object of processing op at the time of resuming the manufacturing. In other words, the processing program generation apparatus 200 adjusts the specifications of the supply of the heat source hs, based on the cross-sectional shape of the object of processing op when the manufacturing has been interrupted. Consequently, the amount of heat input can be controlled based on the cross-sectional shape of the object of processing op when the manufacturing has been interrupted, to reduce the time required to resume the additive manufacturing. At the time of point shaping, the amount of heat input can be finely adjusted by supplying the heat source for a short time, to further improve the precision of the additive manufacturing.

For example, examples of the heat source supply unit command lc when the heat source hs is a laser beam, in other words, the specifications of the heat source hs include the moving speed of the laser beam and the diameter of the laser beam. To prevent a decrease in the precision of the manufacturing of the manufacturing resumption portion rp at the time of resuming the processing, it is desirable to increase the heating temperature of the manufacturing resumption portion rp to the thermal saturation temperature of the shaping portion. Here, the thermal saturation temperature refers to a temperature suitable for additive manufacturing at which the balance between heat input by the heat source under the processing conditions pc for the next layer that is a layer to be stacked, and heat dissipation in the entire shaped region becomes steady.

The thermal saturation temperature changes depending on the shape, the cross-sectional shape, the processing conditions pc, etc. of the object of processing op at the time of resuming the manufacturing. Therefore, it can be difficult to determine the heat source supply unit command lc before starting processing. On the other hand, according to the present embodiment, the temperature measurement unit 9 outputs the temperature data td on the manufacturing resumption portion rp, so that the control unit 1 can determine whether the temperature of the processing position p exceeds the thermal saturation temperature or not. For example, according to the determination result, the control unit 1 can determine the heat source supply unit command lc that depends on whether the thermal saturation temperature is exceeded or not, using a conditional branch included in the basic processing program bpr. The control unit 1 desirably determines the drive command dc so as not to move the processing position p until the thermal saturation temperature is reached. The control unit 1 may store the temperature of the processing position p at the time of the interruption of the additive manufacturing, and bring the temperature of the manufacturing resumption portion rp close to that at the time of the interruption of the additive manufacturing before resuming the additive manufacturing. An example of operation to resume additive manufacturing will be described. For example, the drive command dc in the post-correction processing program bpr may be determined such that the processing position p starts to move when the difference between the temperature of the manufacturing resumption portion rp and the temperature of the processing position p at the time of interruption of additive manufacturing becomes less than or equal to a certain value. Thus, it is desirable to resume additive manufacturing by changing the relative position between the processing position p and the shaped article sc after the temperature of the processing position p, the object of manufacturing op, or the shaping material pm is heated to a predetermined temperature. Consider a case where a shaped article including a plurality of layers is additive-manufactured along a shaping path layer by layer. In this case, when additive manufacturing is interrupted, a resumption shaping path is heated which is a shaping path on a layer on which the additive manufacturing is resumed, of the object of processing op formed before the interruption of the additive manufacturing. After the temperature of the resumption shaping path is heated to a predetermined temperature, the additive manufacturing may be resumed. In this case, it is desirable to heat the entire resumption shaping path to the predetermined temperature or higher. At the time of the heating, the relative position between the processing head 6 and the shaped article sc may be changed as the heat source hs is supplied to the resumption shaping path on the object of processing op formed before the interruption of the additive manufacturing.

Figure 13:
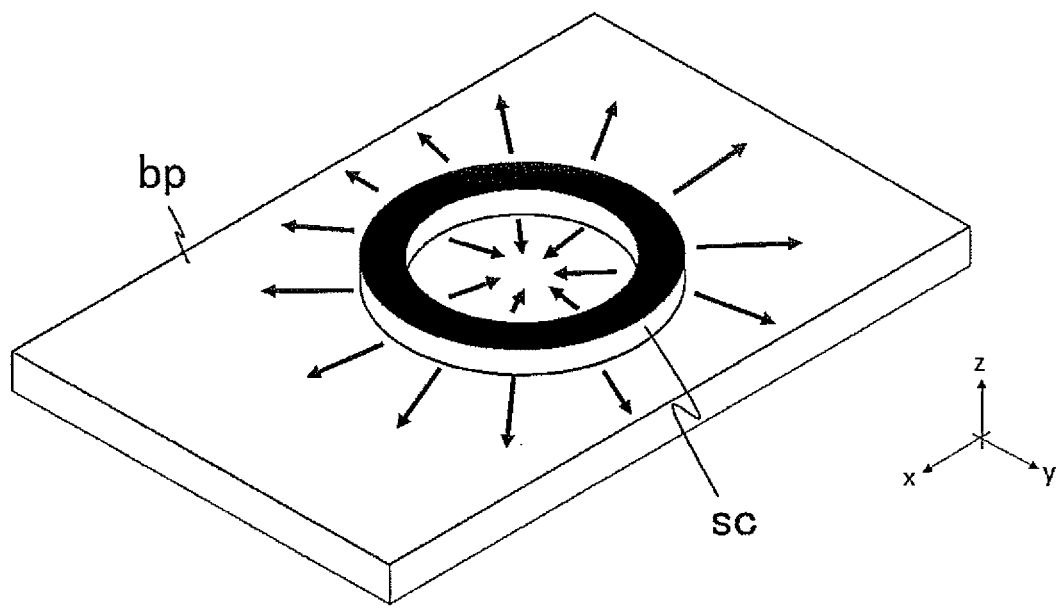
FIG. 13 is a diagram illustrating flows of heat in a base plate and a shaped article in the third embodiment of the present invention.
Figure 13:
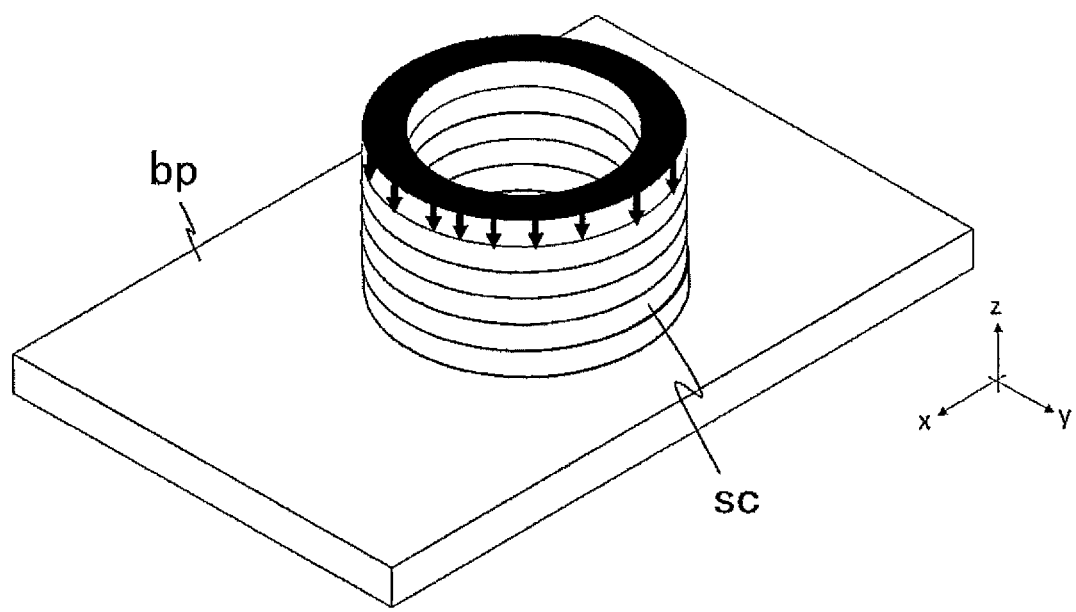

FIG. 13 is a diagram illustrating flows of heat in a base plate and a shaped article in the present embodiment. The top surface of the shaped article sc in FIG. 13 is filled with black to indicate that the surface is heated by the supply of the heat source hs. The shaped article sc in FIG. 13(a) has one layer. The shaped article sc in FIG. 13(b) has six layers. That is, FIG. 13(b) illustrates a state in which five layers have been additive-manufactured from the state in FIG. 13(a). Solid lines perpendicular to the z-axis in FIG. 13 represent boundaries between the layers. In FIG. 13, flows of heat in a base plate bp and in the shaped article sc are indicated by arrows. In FIGS. 13(a) and 13(b), the heat source hs is supplied to the shaped article sc in a direction opposite to the direction of the z axis, that is, from a position where the value of the z axis is large to a position where the value of the z axis is small. In FIG. 13(b), the manufacturing resumption portion rp is farther from the base plate bp than in FIG. 13(a). Therefore, heat discharge performance from the manufacturing resumption portion rp to the base plate bp is more excellent in the configuration of FIG. 13(a) than in the configuration of FIG. 13(b). As a result, the time until the temperature of the manufacturing resumption portion rp reaches the thermal saturation temperature is longer in the configuration of FIG. 13(a) than in the configuration of FIG. 13(b). Thus, the time until the temperature of the manufacturing resumption portion rp reaches the thermal saturation temperature changes depending on the distance between the manufacturing resumption portion rp and the base plate bp, the heat capacity of the shaped article sc, etc.

The temperature measurement unit 9 measures the temperature of the manufacturing resumption portion rp or the shaped article sc and outputs the measured temperature as the temperature data td. The control unit 1 determines the heat source supply unit command lc based on the temperature data td to control the heat source supply unit 2, and performs control to bring the temperature of the manufacturing resumption portion rp close to the thermal saturation temperature. At this time, it is desirable to perform the output control of the heat source until the manufacturing resumption portion rp reaches the thermal saturation temperature while preventing ignition and droplet formation. In addition to the heat source supply unit command lc, the control unit 1 may determine the gas supply command gc based on the temperature data td and perform control to bring the temperature of the processing position p close to the thermal saturation temperature. When the difference between the temperature of the processing position p and the thermal saturation temperature has not come within a certain range, the control unit 1 may determine the drive command dc so as not to move the processing position p. Until the difference from the thermal saturation temperature comes within the certain range in the entire path on the layer on which the manufacturing is resumed, the entire path on the layer on which the manufacturing is resumed may be repeatedly traced to be heated as the heat source supply unit command lc is successively changed to supply the heat source hs to the processing path. The thermal saturation temperature may be set to a temperature lower than the melting point of the shaping material pm. The user may be allowed to input the thermal saturation temperature to the control unit 1 or the processing program generation apparatus 200, according to the processing conditions pc.

In additive manufacturing, finish processing such as grinding and polishing is often performed after additive processing is performed. If an error between a target shape and an obtained shape is large, the load of a downstream process increases. Thus, it is desirable that the error be smaller. During additive manufacturing, it is desirable to perform the additive manufacturing without interruptions from the start to the completion of the manufacturing. However, depending on an additive-manufactured amount, the shaping material pm, a processing path, etc., long-time heat input and long-time manufacturing work can be difficult, causing an interruption between the start and the completion of the additive manufacturing. In this case, at the time of resuming the additive manufacturing, the surface is cooled and oxidation of the surface has proceeded, compared to those before the interruption. In addition, the balance between heat input and heat dissipation has changed, compared to that before the interruption, and it takes time to stabilize the processing. For the reasons as above, the manufacturing precision of a portion where the additive manufacturing has been interrupted can deteriorate.

As described above, in the additive manufacturing method of the present embodiment, when additive manufacturing is interrupted, the shaping material pm is heated to a predetermined temperature by a shaping material heating step before the additive manufacturing is resumed. In the additive manufacturing method of the present embodiment, when additive manufacturing is interrupted, the object of processing op formed before the interruption of the additive manufacturing is heated to a predetermined temperature before the additive manufacturing is resumed. In the additive manufacturing method of the present embodiment, when the shaped article sc consists of a plurality of layers, and additive manufacturing is performed along a shaping path tc layer by layer, the shaping path tc along which the additive manufacturing is to be performed first after resumption of the additive manufacturing is heated to a predetermined temperature before the resumption is performed. The additive manufacturing method of the present embodiment further includes a retraction step of retracting, from the object of processing op, the processing head 6 including the heat source supply port 14 to be an exit port through which to supply the heat source hs to the processing position p, when additive manufacturing is interrupted, and a return step of returning the retreated processing head 6 to the object of processing op before performing the resumption.

According to the present embodiment, when the interruption of additive manufacturing occurs, and further, the additive manufacturing is resumed, heating of the shaped article sc is performed prior to the additive manufacturing. Consequently, the temperature of the manufacturing resumption portion rp or the shaping path tc on a resumption layer is brought close to that at the time of the interruption of the additive manufacturing, allowing high-precision additive manufacturing to be performed. During the heating, the temperature is controlled based on the temperature data td. Consequently, control can be performed to bring the temperature of the processing position p close to the thermal saturation temperature. In addition, smoking, ignition, droplet formation, etc. can be prevented. This allows high-precision additive manufacturing to be performed when an interruption occurs in additive manufacturing. As described above, according to the present embodiment, the precision of additive manufacturing can be improved. In addition, the retraction step allows the avoidance of collisions between the processing head 6 and the object of processing op.

Fourth Embodiment

Figure 14:
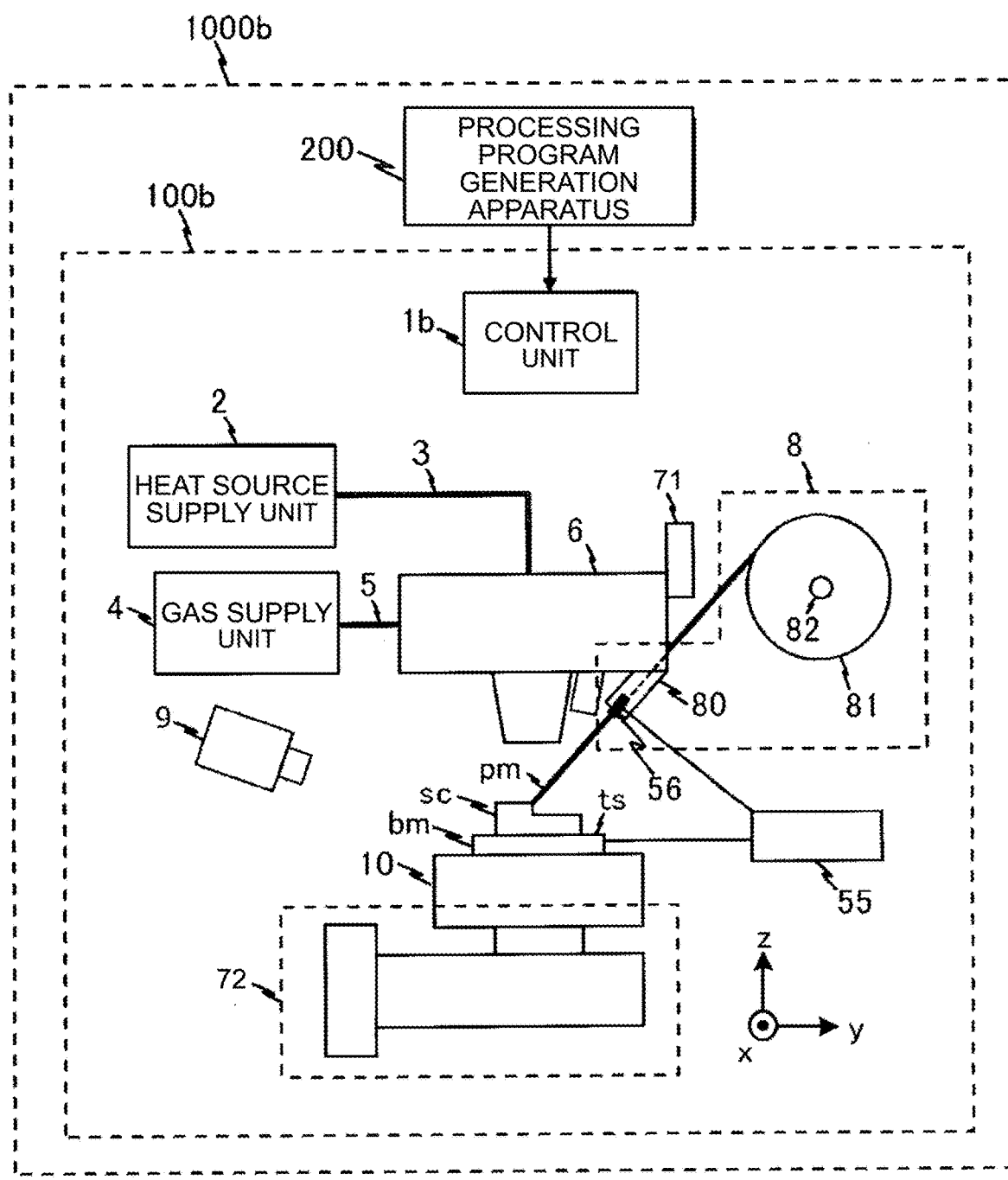
FIG. 14 is a diagram illustrating an example of a configuration of an additive manufacturing system according to a fourth embodiment of the present invention.

In the present embodiment, the shaping material pm is heated using Joule heating. FIG. 14 is a diagram illustrating an example of a configuration of an additive manufacturing system according to the present embodiment. In the description of the present embodiment, components, signals, and others identical or corresponding to the components, signals, and others of the first embodiment are denoted by the same reference numerals.

An additive manufacturing apparatus 100b of the present embodiment includes a power supply 55 and a contact chip 56 in addition to the components of the additive manufacturing apparatus 100 of the first embodiment. The additive manufacturing apparatus 100b includes a control unit 1b in place of the control unit 1 of the first embodiment. The power supply 55 is electrically connected to the contact chip 56 and the base material bm by wires. The power supply 55 applies a voltage to the contact chip 56 and the base material bm, and is sequentially electrically connected from the contact chip 56 to the shaping material pm, from the shaping material pm to the shaped article sc, and from the shaped article sc to the base material bm. A current flowing through the above path increases the temperature of the shaping material pm by Joule heating. This phenomenon is used to heat the shaping material pm.

Figure 15:
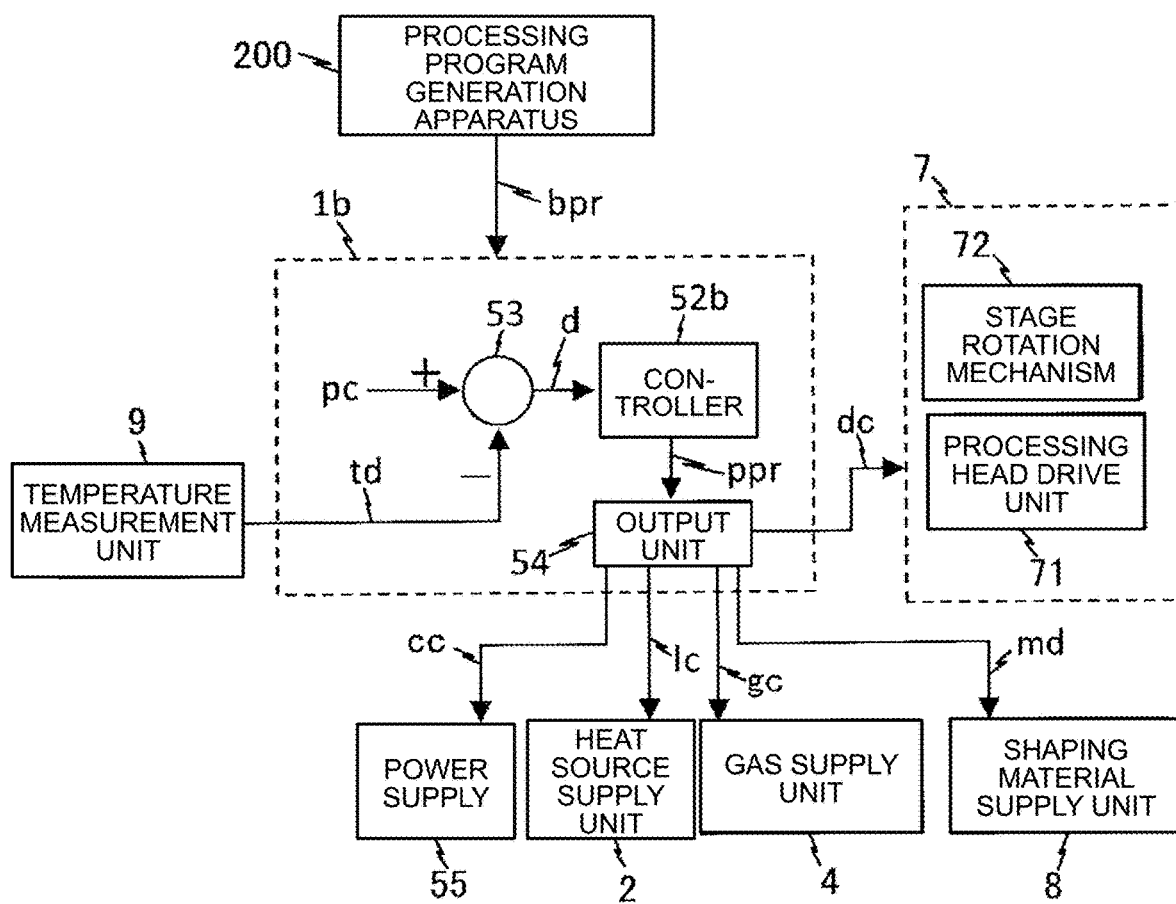
FIG. 15 is a block diagram illustrating a configuration of a control unit according to the fourth embodiment of the present invention.

The power supply 55 can communicate with the control unit 1b. FIG. 15 is a block diagram illustrating an example of a configuration of the control unit according to the present embodiment. For example, the power supply 55 and the control unit 1b may be connected by a signal line. The control unit 1b determines the post-correction processing program ppr based on the temperature data td. The basic processing program bpr and the post-correction processing program ppr of the present embodiment include a current command cc that is a command for a current to be generated by the power supply 55. The control unit 1b is different from the control unit 1 in that the control unit 1b determines the current command cc. The difference between a controller 52b and the controller 52 is that the controller 52b determines the current command cc based on the difference d. A method of determining the current command cc may be similar to that of another command. The power supply 55 passes a current through the shaping material pm based on the current command cc.

For example, the control unit 1b may calculate the current command cc to specify the magnitude of a current of the power supply 55, the current waveform, etc. from the difference d between the melting point, the boiling point, or the like of the shaping material pm included in the processing conditions pc in the basic processing program bpr and the temperature data td, and send the current command cc to the power supply 55. Consequently, the influence of heat on the shaped article sc can be limited during additive manufacturing. Furthermore, the shaping material pm can be heated independently of the heating of the shaped article sc by the output of the heat source hs, for temperature control. Consequently, the precision of manufacturing can be improved.

The shaping material pm desirably has a shape and a material that allow the passage of current and the control of Joule heating. For example, for the shape, a wire shape is more desirable than a powdery material. When the shaping material pm of a wire shape is used, the shaping material pm is a thin wire and thus has a larger resistance value than the shaped article sc, the base material bm, etc. Therefore, heat generated by Joule heating on the shaped article sc and the base material bm by the passage of current from the power supply 55 is smaller than heat generated on the shaping material pm. Thus, only a tip portion of the shaping material pm close to the processing position p can be heated to a target temperature before being supplied to the processing position p. Then, heating by the heat source hs during additive manufacturing can be made smaller.

By controlling the temperature of the shaping material pm, the temperature of the processing position p can be maintained in a predetermined temperature range, and additive manufacturing can be performed with limited temperature changes in portions other than the processing position p. Thus, heat-affected areas in the shaped article sc, the base material bm, etc. can be reduced. Consequently, warpage, bending, and the like of the shaped article sc, the base material bm, etc. due to thermal expansion, contraction, and the like of the shaped article sc, the base material bm, etc. can be prevented. Thus, the occurrence of fatigue, thermal deformation, and the like of the shaped article sc, the base material bm, etc. due to the rise and fall of the temperature can be prevented to produce the shaped article sc.

The configuration of the present embodiment may be provided with the light detection unit 17 in FIG. 10 described in the second embodiment, to change the post-correction processing program ppr in response to the occurrence of ignition, explosion, smoking, or the like, as in the second embodiment. In combination with the present embodiment, the processing of the control unit 1 at the time of interruption of processing described in the third embodiment may be additionally performed. For example, when additive manufacturing is interrupted between the start and the end of the additive manufacturing, the shaping material pm is heated by Joule heating without the supply of the shaping material pm to the processing position p as described in the third embodiment. After the shaping material pm is heated to a predetermined temperature, the shaping material pm is supplied to the processing position p. Then, the heat source hs may be supplied to the processing position p to resume the additive manufacturing. Thus, the shaping material pm may be heated by Joule heating during the interruption of processing.

As described above, the additive manufacturing method of the present embodiment includes a shaping material heating step of heating the shaping material pm by Joule heating, using the shaping material pm of a wire shape. In the additive manufacturing method of the present embodiment, when additive manufacturing is interrupted, the shaping material pm is heated to a predetermined temperature by the shaping material heating step before the additive manufacturing is resumed.

As described above, according to the present embodiment, the precision of additive manufacturing can be improved.

Fifth Embodiment

Figure 16:
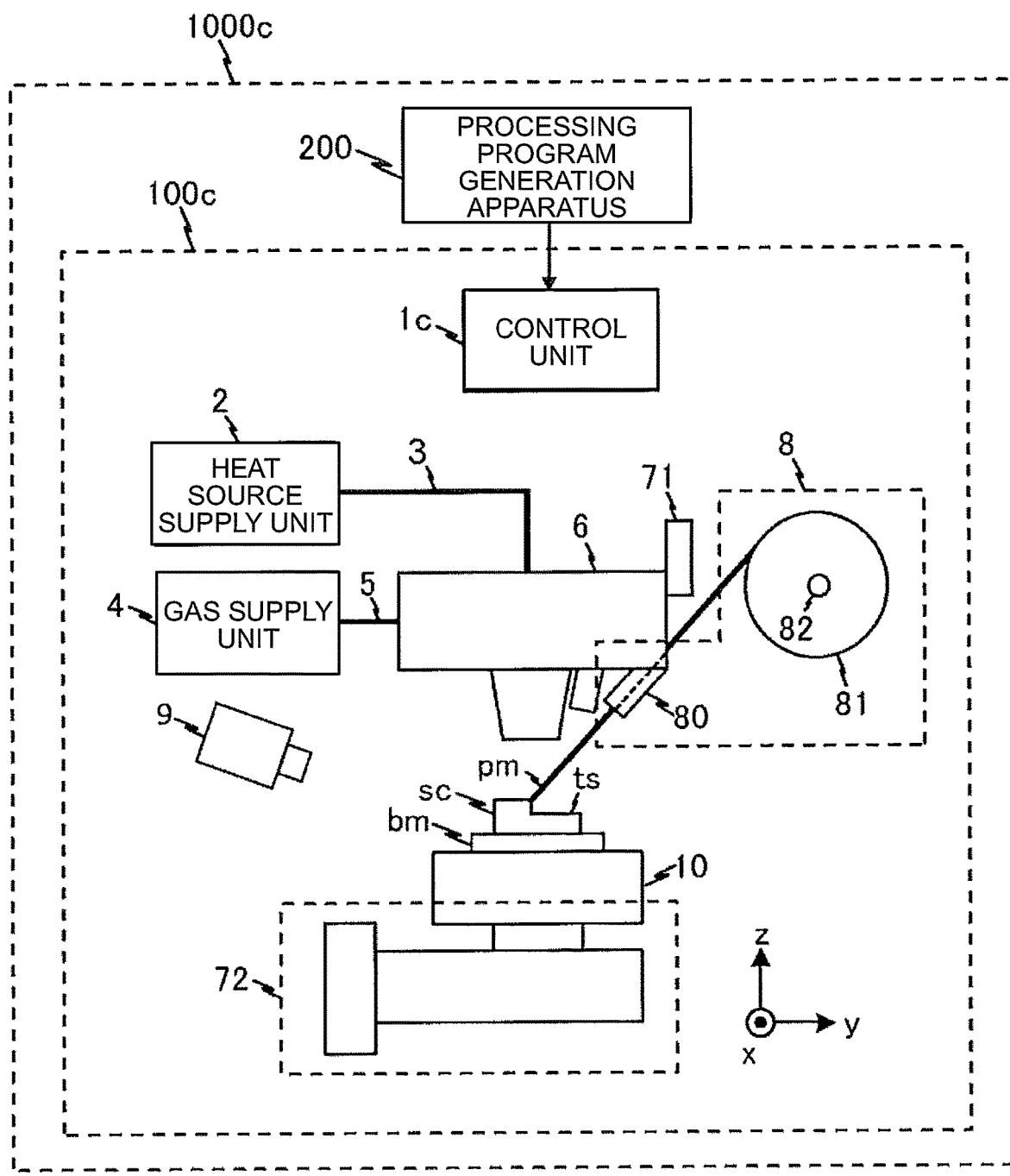
FIG. 16 is a diagram illustrating an example of a configuration of an additive manufacturing system according to a fifth embodiment of the present invention.
Figure 17:
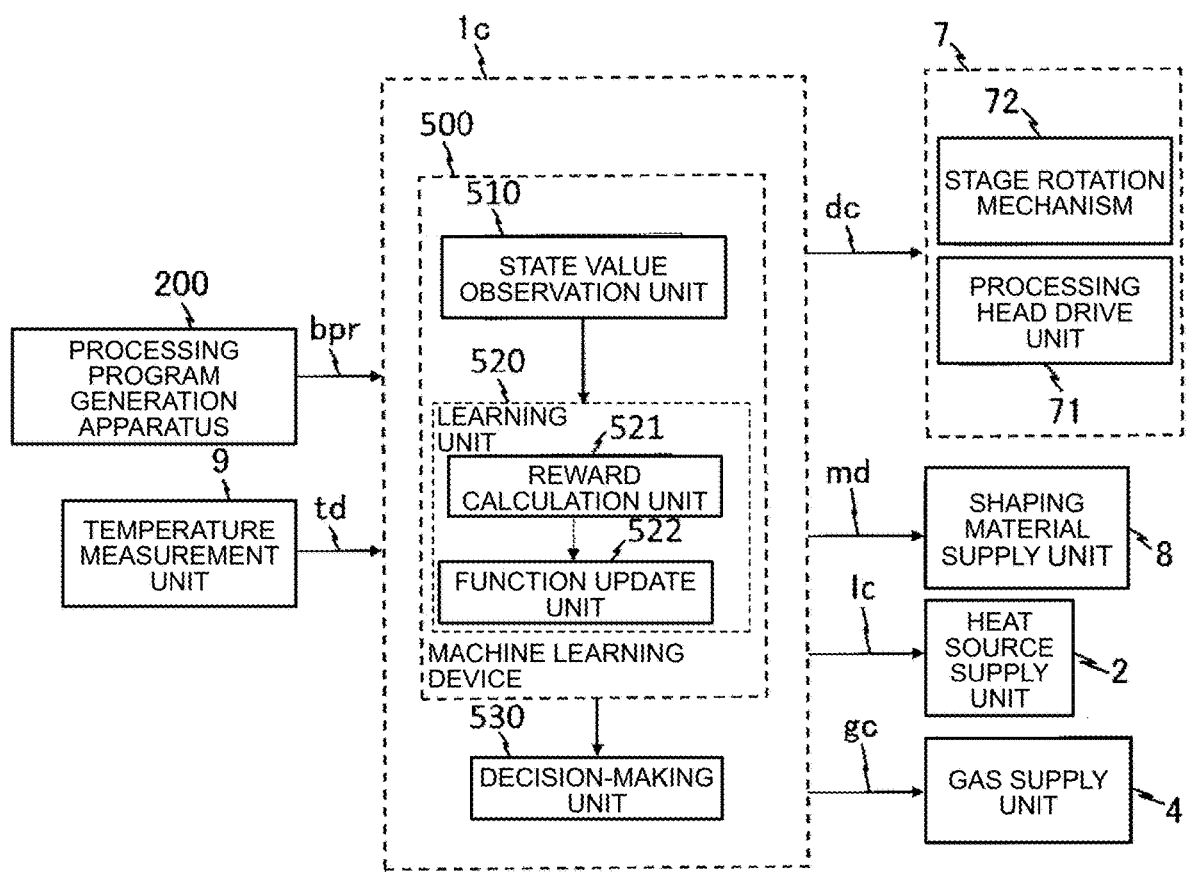
FIG. 17 is a block diagram illustrating a configuration of a control unit according to the fifth embodiment of the present invention.

FIG. 16 is a diagram illustrating an example of a configuration of an additive manufacturing system of the present embodiment. In the description of the present embodiment, components, signals, and others identical or corresponding to the components, signals, and others of the first embodiment are denoted by the same reference numerals. An additive manufacturing system 1000c includes a control unit 1c in place of the control unit 1 of the additive manufacturing system 1000 in the first embodiment. FIG. 17 is a block diagram illustrating an example of a configuration of the control unit 1c.

The control unit 1c includes a machine learning device 500 and a decision-making unit 530. The machine learning device 500 includes a state value observation unit 510 and a learning unit 520. The state value observation unit 510 acquires a state value st that is a value including at least the basic processing program bpr and the temperature data td and is a value related to the state of additive manufacturing.

Examples of the state value st include the basic commands bcv, the post-correction commands ccv, the temperature data td, the light detection result lr described in the second embodiment, the manufacturing resumption portion rp at the time of resumption after the interruption of additive manufacturing described in the third embodiment, the current command cc described in the fourth embodiment, the shape of the shaped article sc at the time of resumption after the interruption of additive manufacturing, a processing path, a cross-sectional shape, a detection result during processing, etc. Examples of the detection result during processing include the temperature data td, the light detection result lr, and a result of detection by a height sensor that measures the height of the processing position p. In addition, the material of the shaping material pm, the material of the base material bm, a formed shape, a laser output, an irradiation time, a cooling time, a processing path, a dust collection power, a heating time, etc. can be examples of the state value included in the processing conditions pc.

The learning unit 520 learns the post-correction commands ccv to form an additive-manufactured shaped article, according to a training data set created based on the state value st acquired by the state value observation unit 510. Here, the learning unit 520 may perform learning for determining the post-correction commands ccv to form an additive-manufactured shaped article from the basic processing program bpr and the temperature data td, according to the training data set. The learning unit 520 may perform learning for determining the post-correction processing program ppr. In this case, since the post-correction commands ccv are included in the post-correction processing program ppr, learning for determining the post-correction commands ccv are performed.

The learning unit 520 may use any learning algorithm. As an example, a case where reinforcement learning is applied will be described. Reinforcement learning is a method in which an agent in a certain environment observes the current state and determines an action to take. The agent obtains a reward from the environment by selecting an action, and learns a policy to obtain the most reward through a series of actions. As typical methods of reinforcement learning, Q-learning and TD-learning are known. For example, in the case of Q-learning, a typical update equation (action-value table) of the action-value function Q(s,a) is expressed by numerical formula (1) below.

Formula 1

$$Q(s_t, a_t) \leftarrow Q(s_t, a_t) + \alpha\left(r_{t+1} + \gamma \max_a Q(s_{t+1}, a) - Q(s_t, a_t)\right) \quad (1)$$

In numerical formula (1), t represents an environment at a time t, and $a_t$ represents an action at the time t. The action at changes the environment to $s_{t+1}$. $r_{t+1}$ represents a reward given due to the environmental change, γ represents a discount factor, and a represents a learning rate. When Q-learning is applied, the processing conditions pc and the processing path are the action $a_t$. Y may take values in the range of $0 \leq \gamma \leq 1$, and α may take values in the range of $0 < \alpha \leq 1$.

In the update equation represented by numerical formula (1), if the action value of the best action a at the time t+1 is larger than the value of the action-value function Q of the action a performed at the time t, the value of the action-value function Q is increased. In the opposite case, the value of the action-value function Q is reduced. In other words, the action-value function Q(s,a) is updated such that the value of the action-value function Q of the action a at the time t approaches the best action value at the time t+1. Thus, the best action value in a certain environment is sequentially propagated to the action values in the previous environments.

A reward calculation unit 521 calculates a reward r based on the state value st. For example, the reward calculation unit 521 may increase the reward r when an error that is a difference in height between a target formed shape and an actual formed shape in each layer is small, and reduce the reward r when the error is large. For example, the reward calculation unit 521 may give a reward of 1 when giving a large reward, and give a reward of −1 when giving a small reward. A function update unit 522 updates the action-value function Q according to the reward r calculated by the reward calculation unit 521. The decision-making unit 530 determines the post-correction commands ccv using the action-value function Q. For example, in the case of Q-learning, the action-value function $Q(s_t, a_t)$ represented by numerical formula (1) may be used as a function for determining a processing path.

Figure 18:
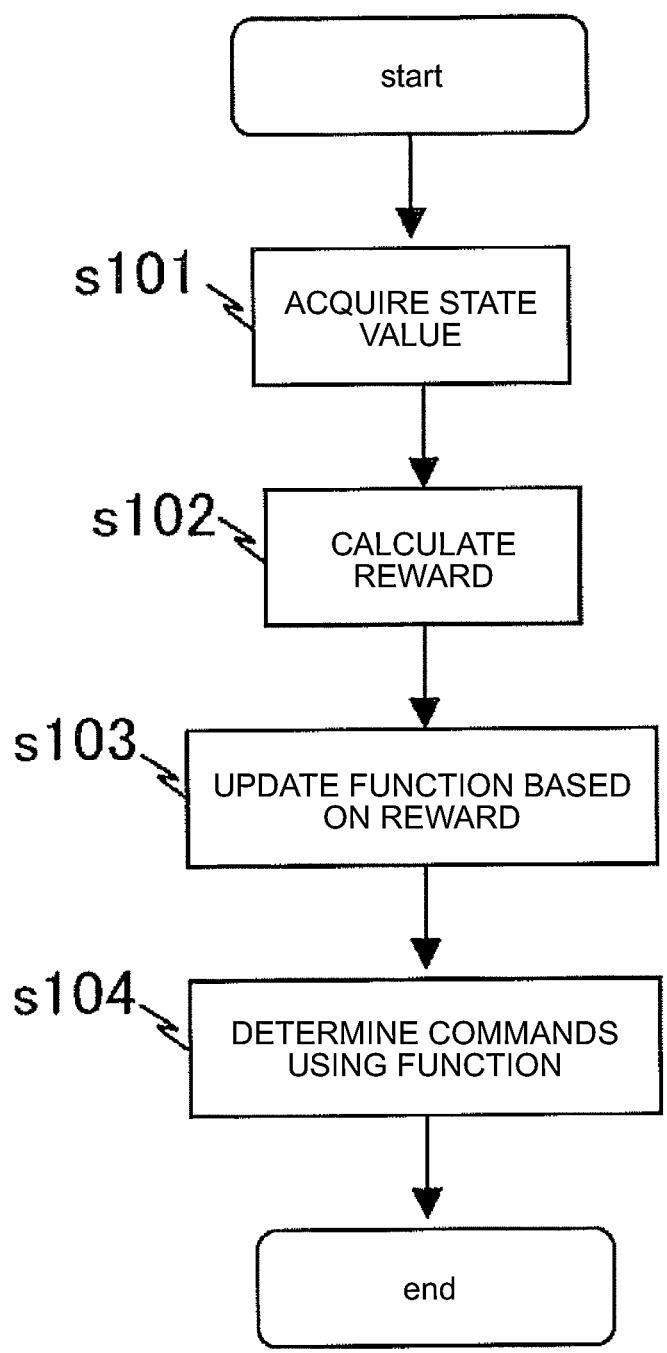
FIG. 18 is a flowchart illustrating an example of operation of the additive manufacturing system according to the fifth embodiment of the present invention.

FIG. 18 is a flowchart illustrating an example of operation of the additive manufacturing system according to the present embodiment. The operation illustrated in FIG. 18 may be performed at every predetermined control cycle when the additive manufacturing apparatus 100b performs additive manufacturing processing on the object of processing op. The decision-making unit 530 determines the post-correction commands ccv for the additive manufacturing apparatus 100c using the action-value function Q determined by the machine learning device 500.

The additive manufacturing apparatus 100c performs the additive manufacturing processing in accordance with the determined post-correction commands ccv. Then, in step s101, the state value observation unit 510 acquires the state value st. As an example, the state value st may be a measured value of a bead height at a shaping portion in each layer obtained by the height sensor. In step s102, the reward calculation unit 521 calculates the reward r based on the state value st.

For example, the reward calculation unit 521 calculates an error between the height of the shaped article sc detected in each layer and the height of a target shape, and determines whether the error is smaller than or equal to a threshold or exceeds the threshold. When the error is smaller than or equal to the threshold, the reward calculation unit 521 gives a large reward. On the other hand, when the error exceeds the threshold, the reward calculation unit 521 gives a small reward. By thus calculating the reward, learning to perform additive manufacturing is performed, and the precision of the additive manufacturing can be improved.

In step s103, the function update unit 522 updates the action-value function based on the reward r. In step s104, the decision-making unit 530 determines the post-correction commands ccv based on the updated action-value function. Here, the decision-making unit 530 may determine the post-correction processing program ppr.

The state value observation unit 510 acquires the light detection result lr described in the second embodiment as the state value st. If the number of occurrences of droplet formation, ignition, smoking, etc. is large, the reward r to be given by the reward calculation unit 521 may be reduced. If the number of occurrences of droplet formation, ignition, smoking, etc. is small, the reward calculation unit 521 may increase the reward r to be given. This allows execution of learning to determine the post-correction commands ccv that cause a small number of occurrences of droplet formation, ignition, smoking, etc. Thus, additive manufacturing with a high manufacturing precision can be performed. In a case where additive manufacturing is interrupted as described in the third embodiment, a large reward may be given if the precision of the additive manufacturing at the time of resumption is high, and a small reward may be given if the precision of the additive manufacturing at the time of resumption is low. The learning unit 520 may perform learning to determine the post-correction commands ccv for performing high-precision additive manufacturing at the time of resumption of additive manufacturing. The current command cc described in the fourth embodiment may be included in the state value, and learning to determine the post-correction commands ccv including the current command cc may be performed.

Although the above has described the example using reinforcement learning, the machine learning device 500 may perform machine learning according to another known method such as a neural network, genetic programming, functional theoretical programming, or a support vector machine.

Further, part or all of the control unit 1c may be connected to a portion other than the control unit 1c in the additive manufacturing apparatus 100c via, for example, a network. Furthermore, part or all of the control unit 1c may be present on a cloud server.

A trained learning machine that has already performed learning by the machine learning device 500 may be applied to another additive manufacturing apparatus than an additive manufacturing apparatus that has performed the learning. For example, the other additive manufacturing apparatus may include a state value acquisition unit 310 that observes the state value st, which is a value related to the state of additive manufacturing, including at least the basic processing program bpr and the temperature data td, in an additive manufacturing apparatus different from the additive manufacturing apparatus 100c. Then, the other additive manufacturing apparatus may include the trained learning machine that has performed learning to determine the post-correction commands ccv to form an additive-manufactured shaped article from the basic processing program bpr and the temperature data td, based on the state value st.

The trained learning machine may be, for example, the decision-making unit 530 including the updated action-value function Q whose update has been performed. By using the trained learning machine, the additive manufacturing apparatus installed with the trained learning machine can determine the post-correction commands ccv to form an additive-manufactured shaped article without performing new learning, and perform high-precision additive manufacturing processing. A machine learning device in which the decision-making unit 530 is omitted from the control unit 1c in FIG. 17 may be constructed. By this machine learning device repeatedly acquiring the state value st from the outside and repeatedly performing learning, a trained learning machine installed with the learning results may be constructed.

In FIG. 16, the control unit 1c constitutes one additive manufacturing apparatus, but the machine learning device 500 may be connected to mechanical device portions of a plurality of additive manufacturing apparatuses. Here, the mechanical device portions refer to portions other than the machine learning device, for example, portions of the additive manufacturing apparatus 100c from which the machine learning device 500 is removed, etc. The state value st may be acquired from the mechanical device portions of the plurality of additive manufacturing apparatuses connected to the machine learning device 500. The mechanical device portions may be a plurality of devices used at the same site or may be devices independently operated at different sites.

Further, mechanical device portions from which the machine learning device 500 collects a data set may be added to the subjects in the middle of collecting the data set, or may be removed from the subjects in the middle. Furthermore, a machine learning device that has performed learning on a certain mechanical device portion may be mounted to a different mechanical device portion and perform learning again to update the learning results.

As described above, the additive manufacturing apparatus 100c of the present embodiment includes the state value observation unit 510 that observes a value related to additive manufacturing, including at least the basic commands bcv, the processing conditions pc, and the temperature data td as the state value st, and the learning unit 520 that learns the post-correction commands ccv to perform the additive manufacturing from the basic commands bcv, the processing conditions pc, and the temperature data td, based on the state value st. The additive manufacturing apparatus of the present embodiment includes the state value observation unit 510 that observes a value related to additive manufacturing, including at least the basic commands bcv, the processing conditions pc, and the temperature data td as the state value st, and a trained learning device that has learned the post-correction commands ccv to perform the additive manufacturing from the basic commands bcv, the processing conditions pc, and the temperature data td, based on the state value st.

According to the present embodiment, the post-correction commands ccv can be determined using the results of performing learning. According to the present embodiment, the precision of additive manufacturing can be improved.

As described above, according to the present embodiment, the precision of additive manufacturing can be improved.

REFERENCE SIGNS LIST

1 control unit; 2 heat source supply unit; 3 heat source path; 4 gas supply unit; 5 pipe; 6 processing head; 7 drive unit; 8 shaping material supply unit; 9 temperature measurement unit; 10 stage; 12 dust collector; 13 gas nozzle; 14 heat source supply port; 16a rotating member; 17 light detection unit; 41 CPU; 42 RAM; 43 ROM; 44 external storage device; 45 input/output interface; 46 bus; 47 processing circuitry; 52, 52a controller; 53 difference calculator; 54 output unit; 55 power supply; 56 contact chip; 71 processing head drive unit; 72 stage rotation mechanism; 80 wire nozzle; 81 wire spool; 82 spool drive apparatus; 100, 100a, 100b, 100c additive manufacturing apparatus; 200 processing program generation apparatus; 201 data input unit; 202 data storage unit; 203 processing path generation unit; 204 processing program generation unit; 300 CAD data; 400 stacking condition data; 500 machine learning device; 510 state value observation unit; 520 learning unit; 521 reward calculation unit; 522 function update unit; 530 decision-making unit; 1000, 1000a, 1000b, 1000c additive manufacturing system; bm base material; bcv basic command; bpr basic processing program; ccv post-correction command; ppr post-correction processing program; dc drive command; g shielding gas; gc gas supply command; hs heat source; lr light detection result; and material supply command; lc heat source supply unit command; op object of processing; p processing position; pc processing condition; pm shaping material; sc shaped article; st state value; td temperature data; is target surface.

The invention claimed is:

1. An additive manufacturing method, comprising:
measuring a temperature of an object of processing or a shaping material and outputting the measured temperature as temperature data;
correcting basic commands based on a basic processing program including the basic commands and processing conditions and the temperature data, and determining post-correction commands including a material supply command, a heat source supply unit command, a drive command, and a gas supply command;
supplying the shaping material to a processing position on a target surface of a shaped article based on the material supply command;
supplying a heat source to melt the shaping material supplied to the processing position to the processing position based on the heat source supply unit command;
changing a relative position between the processing position and the shaped article based on the drive command;
supplying, to the processing position, a shielding gas to prevent a reaction of the shaping material to the processing position based on the gas supply command so that the shielding gas surrounds a position where the heat source hits the processing position, the shielding gas being supplied from a gas nozzle to the processing position; and
sucking an atmosphere around the processing position by a dust collector with a tip of a suction port located away from a nozzle tip of the gas nozzle in a direction opposite to a direction in which the shielding gas is ejected when viewed from the processing position.

2. An additive manufacturing method, comprising:
measuring a temperature of an object of processing or a shaping material and outputting the measured temperature as temperature data;
detecting light from a processing position on a target surface of a shaped article and outputting the detected light as a light detection result;
correcting basic commands based on a basic processing program including the basic commands and processing conditions, the temperature data, and the light detection result, determining post-correction commands including a material supply command, a heat source supply unit command, a drive command, and a gas supply command, and performing at least one of increasing an amount of supply of a shielding gas to prevent a reaction of the shaping material, reducing an amount of supply of a heat source to melt the shaping material supplied to the processing position, increasing an amount of supply of the shaping material, or reducing a rate of change in a relative position between the processing position and the shaped article, when finding an anomalous state that is a state in which occurrence of any one of droplet formation, ignition, smoking, or explosion is detected based on the light detection result;
supplying the shaping material to the processing position based on the material supply command;
supplying the heat source to the processing position based on the heat source supply unit command;
changing the relative position based on the drive command;
supplying the shielding gas to the processing position based on the gas supply command; and
sucking an atmosphere around the processing position.

3. The additive manufacturing method according to claim 2, wherein when a steady state is found which is a state in which occurrence of any one of droplet formation, ignition, smoking, or explosion is not detected based on the light detection result, the basic commands are corrected based on the basic processing program and the temperature data, and the post-correction commands including the material supply command, the heat source supply unit command, the drive command, and the gas supply command are determined.

4. The additive manufacturing method according to claim 1, comprising heating the shaping material of a wire shape by Joule heating.

5. The additive manufacturing method according to claim 4, wherein when additive manufacturing is interrupted, the shaping material is heated to a predetermined temperature before the additive manufacturing is resumed.

6. The additive manufacturing method according to claim 1, wherein
when additive manufacturing is interrupted, the object of processing formed before the interruption of the additive manufacturing is heated to a predetermined temperature before the additive manufacturing is resumed.

7. The additive manufacturing method according to claim 6, wherein
the shaped article includes a plurality of layers,
the additive manufacturing is performed along a shaping path for each layer of the plurality of layers, and
the shaping path along which the additive manufacturing is to be performed first after resumption of the additive manufacturing is heated to a predetermined temperature before the resumption is performed.

8. The additive manufacturing method according to claim 6, comprising:
retracting, from the object of processing, a processing head including a heat source supply port to be an exit port through which to supply the heat source to the processing position, when the additive manufacturing is interrupted; and
returning the retreated processing head to the object of processing before performing the resumption.

9. An additive manufacturing apparatus, comprising:
a temperature sensor to measure a temperature of an object of processing or a shaping material and output the measured temperature as temperature data;
a controller to correct basic commands based on a basic processing program including the basic commands and processing conditions and the temperature data, and determine post-correction commands including a material supply command, a heat source supplier command, a drive command, and a gas supply command;
a shaping material supplier to supply the shaping material to a processing position on a target surface of a shaped article based on the material supply command;
a heat source supplier to supply a heat source to melt the shaping material supplied to the processing position to the processing position based on the heat source supplier command;
a driver to change a relative position between the processing position and the shaped article based on the drive command;
a gas supplier to supply, to the processing position, a shielding gas to prevent a reaction of the shaping material to the processing position based on the gas supply command so that the shielding gas surrounds a position where the heat source hits the processing position, the shielding gas being supplied from a gas nozzle to the processing position; and
a dust collector with a tip of a suction port located away from a nozzle tip of the gas nozzle in a direction opposite to a direction in which the shielding gas is ejected when viewed from the processing position, to suck an atmosphere around the processing position.

10. The additive manufacturing apparatus according to claim 9, comprising:
a state value observation circuitry to observe a value related to additive manufacturing, including at least the basic commands, the processing conditions, and the temperature data, as a state value; and
a learning circuitry to learn the post-correction commands to perform the additive manufacturing from the basic commands, the processing conditions, and the temperature data, based on the state value.

11. The additive manufacturing apparatus according to claim 9, comprising:
a state value observation circuitry to observe a value related to additive manufacturing, including at least the basic commands, the processing conditions, and the temperature data, as a state value; and
a trained learning circuitry that has learned the post-correction commands to perform the additive manufacturing from the basic commands, the processing conditions, and the temperature data, based on the state value.

12. An additive manufacturing system, comprising:
the additive manufacturing apparatus according to claim 9; and
a processing program generation apparatus to generate the basic processing program.

13. The additive manufacturing method according to claim 2, wherein
in detecting the light, scattered light or transmitted light is detected as the light detection result, and
the scattered light is light generated from the processing position or light supplied from outside, scattered by the shaping material, a flying object, or smoke, and the transmitted light is light generated from the processing position or light supplied from outside, transmitted through smoke, the shielding gas, or the atmosphere.

14. The additive manufacturing method according to claim 2, comprising heating the shaping material of a wire shape by Joule heating.

15. The additive manufacturing method according to claim 14, wherein when additive manufacturing is interrupted, the shaping material is heated to a predetermined temperature before the additive manufacturing is resumed.

16. The additive manufacturing method according to claim 2, wherein
when additive manufacturing is interrupted, an object of processing formed before the interruption of the additive manufacturing is heated to a predetermined temperature before the additive manufacturing is resumed.

17. The additive manufacturing method according to claim 16, wherein
the shaped article includes a plurality of layers,
the additive manufacturing is performed along a shaping path for each layer of the plurality of layers, and
the shaping path along which the additive manufacturing is to be performed first after resumption of the additive manufacturing is heated to a predetermined temperature before the resumption is performed.

18. The additive manufacturing method according to claim 16, comprising:
retracting, from the object of processing, a processing head including a heat source supply port to be an exit port through which to supply the heat source to the processing position, when the additive manufacturing is interrupted; and
returning the retreated processing head to the object of processing before performing the resumption.

19. An additive manufacturing apparatus, comprising:
a temperature sensor to measure a temperature of an object of processing or a shaping material and output the measured temperature as temperature data;

a light detector to detect light from a processing position on a target surface of a shaped article and output the detected light as a light detection result;

a controller to correct basic commands based on a basic processing program including the basic commands and processing conditions, the temperature data, and the light detection result, determine post-correction commands including a material supply command, a heat source supplier command, a drive command, and a gas supply command, and perform at least one of increasing an amount of supply of a shielding gas to prevent a reaction of the shaping material, reducing an amount of supply of a heat source to melt the shaping material supplied to the processing position, increasing an amount of supply of the shaping material, or reducing a rate of change in a relative position between the processing position and the shaped article, when finding an anomalous state that is a state in which occurrence of any one of droplet formation, ignition, smoking, or explosion is detected based on the light detection result;

a shaping material supplier to supply the shaping material to the processing position based on the material supply command;

a heat source supplier to supply the heat source to the processing position based on the heat source supplier command;

a driver to change the relative position based on the drive command;

a gas supplier to supply the shielding gas to the processing position based on the gas supply command; and a dust collector to suck an atmosphere around the processing position.

20. The additive manufacturing apparatus according to claim 19, wherein when the controller finds a steady state that is a state in which occurrence of any one of droplet formation, ignition, smoking, or explosion is not detected based on the light detection result, the controller corrects the basic commands based on the basic processing program and the temperature data, and determines the post-correction commands including the material supply command, the heat source supplier command, the drive command, and the gas supply command.

21. The additive manufacturing apparatus according to claim 19, wherein the light detector detects scattered light or transmitted light as the light detection result, and the scattered light is light generated from the processing position or light supplied from outside, scattered by the shaping material, a flying object, or smoke, and the transmitted light is light generated from the processing position or light supplied from outside, transmitted through smoke, the shielding gas, or the atmosphere.

22. The additive manufacturing apparatus according to claim 19, comprising:

a state value observation circuitry to observe a value related to additive manufacturing, including at least the basic commands, the processing conditions, and the temperature data, as a state value; and a learning circuitry to learn the post-correction commands to perform the additive manufacturing from the basic commands, the processing conditions, and the temperature data, based on the state value.

23. The additive manufacturing apparatus according to claim 19, comprising:

a state value observation circuitry to observe a value related to additive manufacturing, including at least the basic commands, the processing conditions, and the temperature data, as a state value; and a trained learning circuitry that has learned the post-correction commands to perform the additive manufacturing from the basic commands, the processing conditions, and the temperature data, based on the state value.

24. An additive manufacturing system, comprising:

the additive manufacturing apparatus according to claim 19; and a processing program generation apparatus to generate the basic processing program.

* * * * *